(12) United States Patent
Lee et al.

(10) Patent No.: US 7,625,515 B2
(45) Date of Patent: Dec. 1, 2009

(54) FABRICATION OF LAYER-BY-LAYER PHOTONIC CRYSTALS USING TWO POLYMER MICROTRANSFER MOLDING

(75) Inventors: Jae-Hwang Lee, Ames, IA (US);
Kai-Ming Ho, Ames, IA (US);
Yong-Sung Kim, Ames, IA (US);
Kristen Constant, Ames, IA (US);
Chang-Hwan Kim, Ames, IA (US)

(73) Assignee: Iowa State University Research Foundation, Inc., Ames, IA (US)

( * ) Notice: Subject to any disclaimer, the term of this patent is extended or adjusted under 35 U.S.C. 154(b) by 487 days.

(21) Appl. No.: 11/455,486

(22) Filed: Jun. 19, 2006

(65) Prior Publication Data

US 2007/0289119 A1  Dec. 20, 2007

(51) Int. Cl.
*H01L 21/00* (2006.01)
(52) U.S. Cl. .................. 264/496; 264/1.7; 264/430; 264/40.1; 264/642; 264/255; 264/308; 427/295; 438/28; 438/29
(58) Field of Classification Search .............. 264/271.1, 264/308, 401, 430, 496, 40.1, 642, 1.7, 255; 427/295; 438/28, 29
See application file for complete search history.

(56) References Cited

U.S. PATENT DOCUMENTS

| | | | | |
|---|---|---|---|---|
| 5,136,678 | A | * | 8/1992 | Yoshimura ................. 385/132 |
| 6,027,595 | A | * | 2/2000 | Suleski ...................... 156/230 |
| 6,355,198 | B1 | * | 3/2002 | Kim et al. ................... 264/259 |
| 6,538,087 | B2 | * | 3/2003 | Zhao et al. .................. 526/280 |
| 6,555,406 | B1 | * | 4/2003 | Leung et al. ................. 438/22 |
| 6,583,350 | B1 | | 6/2003 | Gee et al. |
| 6,586,775 | B2 | | 7/2003 | Hirayama |
| 6,611,085 | B1 | | 8/2003 | Gee et al. |
| 6,677,175 | B2 | * | 1/2004 | Zhao et al. .................... 438/31 |
| 6,768,256 | B1 | | 7/2004 | Fleming et al. |
| 6,852,203 | B1 | | 2/2005 | Kawakami et al. |
| 6,858,079 | B2 | | 2/2005 | Norris et al. |

(Continued)

OTHER PUBLICATIONS

Paul V. Braun and Pierre Wiltzius, Electrochemical Fabrication of 3D Microperiodic Porous Materials, Advanced Materials, vol. 13, # 7, 200, pp. 482-485.*

(Continued)

*Primary Examiner*—Joseph S. Del Sole
*Assistant Examiner*—Timothy Kennedy
(74) *Attorney, Agent, or Firm*—Reinhart Boerner Van Deuren P.C.

(57) ABSTRACT

A method of manufacturing photonic band gap structures operable in the optical spectrum has been presented. The method comprises the steps of filling a plurality of grooves of an elastomeric mold with a UV curable first polymer, each groove in parallel with each other and partially curing the first polymer. A second polymer is coated on the first polymer. A substrate or a multi-layer polymer structure is placed on the filled mold and the resulting structure is exposed to UV light (i.e., is UV cured). The mold is peeled away from the first and second polymers such that a layer of polymer rods is formed on the substrate/multi-layer polymer structure. The process is repeated until a desired number of layers have been formed. The multi-layer structure can be used to create ceramic and metallic photonic band gaps by infiltration, electro-deposition, and/or metal coating.

21 Claims, 25 Drawing Sheets
(5 of 25 Drawing Sheet(s) Filed in Color)

U.S. PATENT DOCUMENTS

| | | | |
|---|---|---|---|
| 6,869,330 | B2 | 3/2005 | Gee et al. |
| 6,898,362 | B2 | 5/2005 | Forbes et al. |
| 6,940,174 | B2 | 9/2005 | Lin et al. |
| 6,977,768 | B2 | 12/2005 | Yamaguchi |
| 6,979,105 | B2 | 12/2005 | Leysath |
| 7,078,697 | B2 | 7/2006 | Barker et al. |
| 7,085,038 | B1 | 8/2006 | Etheridge, III et al. |
| 7,141,617 | B2 | 11/2006 | Gratson et al. |
| 2003/0008244 | A1* | 1/2003 | Khanarian et al. ........... 430/321 |
| 2003/0201429 | A1* | 10/2003 | He et al. ...................... 252/583 |
| 2004/0036814 | A1* | 2/2004 | Yamaguchi .................... 349/2 |
| 2005/0166837 | A1* | 8/2005 | Marshall ..................... 117/200 |

OTHER PUBLICATIONS

Andreas Stein and Rick C. Schroden, Colloidal Crystal Templating of Three-Dimensionally Ordered Macroporous SWolids: Materials for Photonics and Beyond, Current Opinion in Solid State and Materials Science, vol. 5, 2001, pp. 553-564.*

Jae-Hwang Lee, Chang-Hwan Kim, Yong-Sung Kim, Kai-Ming Ho, Kristen Constant, Wai Leung, Cha-Hwan Oh, Diffracted Moire Fringes as Analysis and Alignment Tools for Multilayer Fabrication in Soft Lithography, Applied Physics Letter, vol. 86, 2005, pp. 204101-1-204101-3.*

KK Mendu, J Shi, YF Lu, LP Li, N Batta, DW Doerr, DR Alexander, Fabrication of Multi-Layered Inverse Opals Using Laser Assisted Imprinting, Nanotechnology, vol. 16, 2005, pp. 1965-1968.*

X Wei and A Atkinson, Ceramic-Metal Interpenetrating Network Composites Formed by Electrodeposition, J. of the Electrochemical Society, vol. 152, #8, 2005, pp. C513-C519.*

Paul V. Braun and Pierre Wiltzius, Electromechanical Fabrication of 3D Microperiodic Porous Materials, Advanced Materials, vol. 13, No. 7, Published 2001, pp. 482-485.*

Jae-Hwang Lee et al., Two-Polymer Microtransfer Molding for Highly Layered Microstructures, Paper, 2005, pp. 2481-2485, Adv. Mater. 2005, 17, DOI: 10.1002/adma.200500721, Advanced Materials, Wiley-VCH Verlag GmbH & Co. KGaA, Weinheim.

R.S. Bergman et al., Applications of thin film reflecting coating technology to tungsten filament lamps, Report, Nov. 1993, pp. 418-428, IEE Proceedings-A, vol. 140, No. 6.

Alfred Thelen, Design of a hot mirror: contest results, Paper, Sep. 1, 1996, pp. 4966-4977; Applied Optics / vol. 35, No. 25.

Mikrajuddin et al; Single Route for Producing Organized Metallic Domes, Dots, and Pores by Colloidal Templating and Over-Sputtering; Paper; Jun. 18, 2002; pp. 930-933; Adv Mater. 2002,14, No. 12; Advanced Materials.

Lianbin Xu et al; Synthesis and Magnetic Behavior of Periodic Nickel Sphere Arrays; Paper; Sep. 16, 2003; pp. 1562-1564; Adv. Mater. 2003, 15, No. 18; Advanced Materials.

Jeffrey S. King et al; $TiO_2$ Inverse Opals Fabricated Using Low-Temperature Atomic Layer Deposition; Paper; Apr. 18, 2005; pp. 1010-1013; Adv. Mater. 2005, 17, No. 8; Advanced Materials.

Shawn-Yu Lin et al; Experimental observation of photonic-crystal emission near a photonic band edge; Paper; Jul. 28, 2003; pp. 593-595; Applied Physics Letters, vol. 83, No. 4.

J. S. King et al; High-filling-fraction inverted ZnS opals fabricated by atomic layer deposition; Paper; Sep. 29, 2003; pp. 2566-2568; Applied Physics Letters, vol. 83, No. 13.

Jean-Michel; Lourtioz et al; Microcavities and Photonic Crystals; Metallic photonic crystals; Article; 2002; pp. 79-88; C. R. Physique 3 (2002).

Lianbin Xu et al; Electrodeposited nickel and gold nanoscale metal meshes with potentially interesting photonic properties; Article; 2000; pp. 997-998; Chem. Commun., 2000.

Irina Puscasu et al. Extraordinary emission from two-dimensional plasmonic-photonic crystals; Article; 2005; pp. 1-6; Journal Of Applied Physics 98, 013531 (2005).

Beatriz H. Juarez et al; Formation of Zinc Inverted Opals on Indium Tin Oxide and Silicon Substrates by Electrochemical Deposition; Article; 2004; pp. 16708-16712; J. Phys. Chem. B 2004, Vo. 108, No. 43.

Timothy D. Drysdale et al.; Metallic tunable photonic crystal filter for terahertz frequencies; Article; Nov./Dec. 2003; pp. 2878-2882; J. Vac. Sci. Technol. B, vol. 21, No. 6.

C. Cuisin et al.; Fabrication of three-dimensional photonic structures with submicrometer resolution by x-ray lithography; Article; Nov./Dec. 2000; pp. 3505-3509; J. Vac. Sci. Technol. B, vol. 18, No. 6.

F. Romanato et al; Fabrication of 3D metallic photonic crystals by X-ray lithography; Paper; 2003; pp. 479-486; Microelectronic Engineering 67-68 (2003).

J. G. Fleming et al; All-metallic three-dimensional photonic crystals with a large infrared bandgap; Article; May 2, 2002; pp. 52-55; Nature, vol. 417.

Ivan Celanovic et al; Resonant-cavity enhanced thermal emission; Article; 2005; pp. 1-6; Physical Review B 72, 075127 (2005).

M. Laroche et al; Coherent Thermal Antenna Using a Photonic Crystal Slab; Article; week ending Mar. 31, 2006; pp. 1-4; Physical Review Letters 96, 123903 (2006).

Anvar A. Zakhidov et al; Carbon Structures with Three-Dimensional Periodicity at Optical Wavelengths; Article; Oct. 30, 1998; pp. 897-901; Research Articles; Science, vol. 282.

Zhi-Yuan Li et al., Photonic band structures solved by a plane-wave-based transfer matrix method, Paper, 2003, Physical Review E 67, 046607 (2003), The American Physical Society.

* cited by examiner

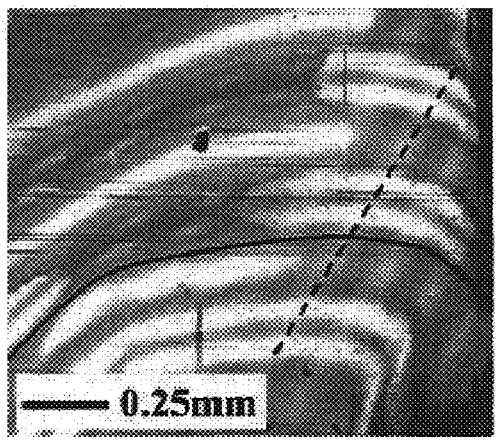 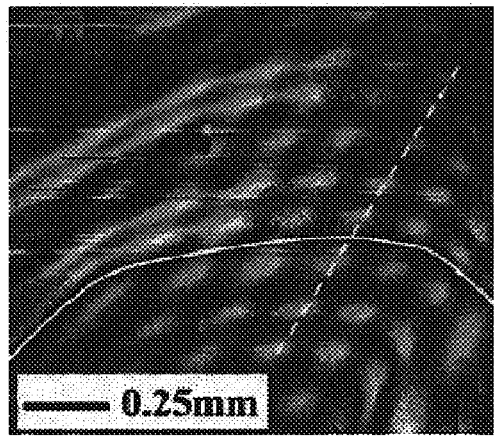
FIG. 8A          FIG. 8B
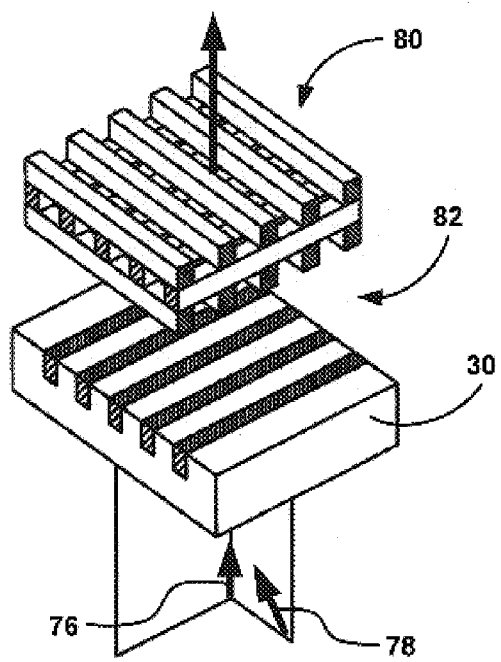
FIG. 8C

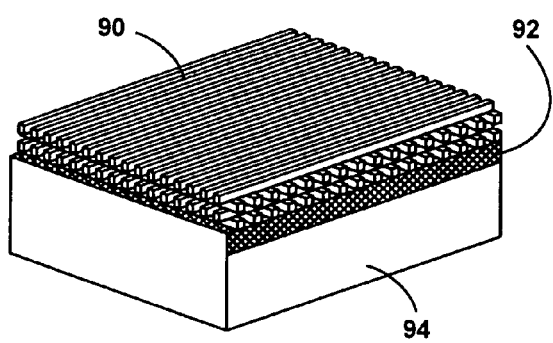 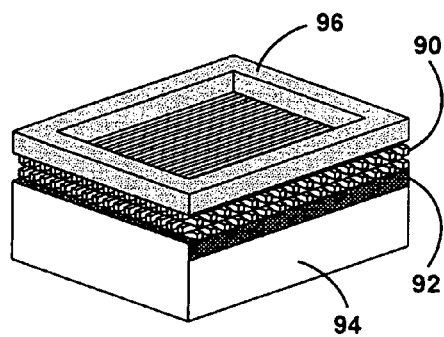
FIG. 10A    FIG. 10B
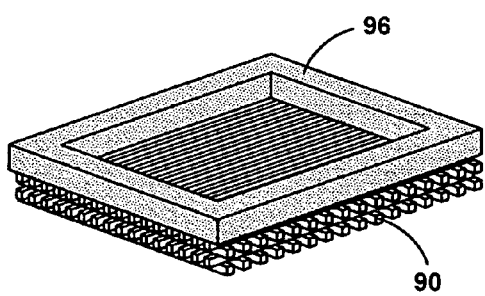 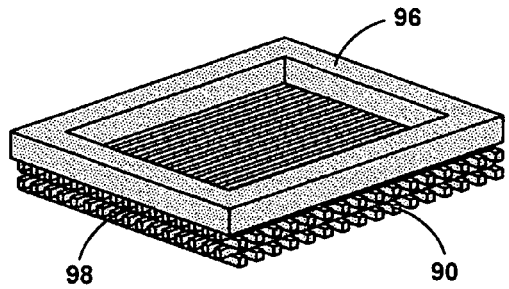
FIG. 10C    FIG. 10D

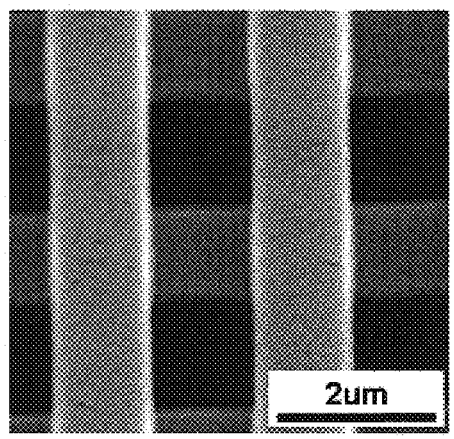
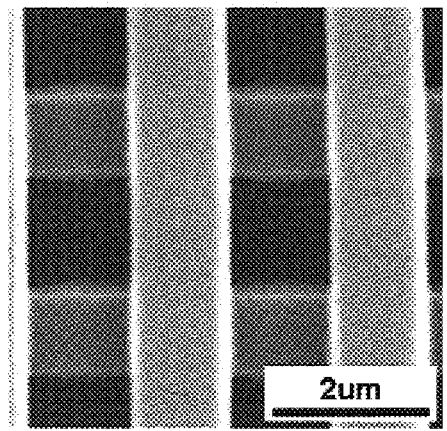
FIG. 12A
FIG. 12B
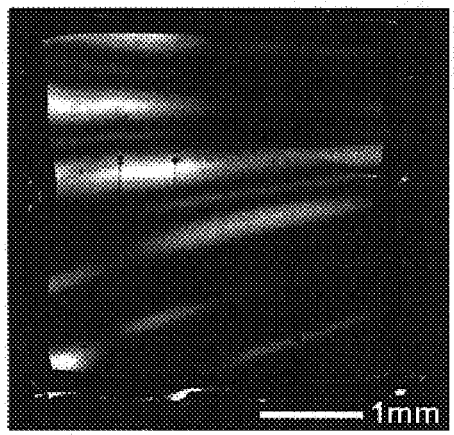
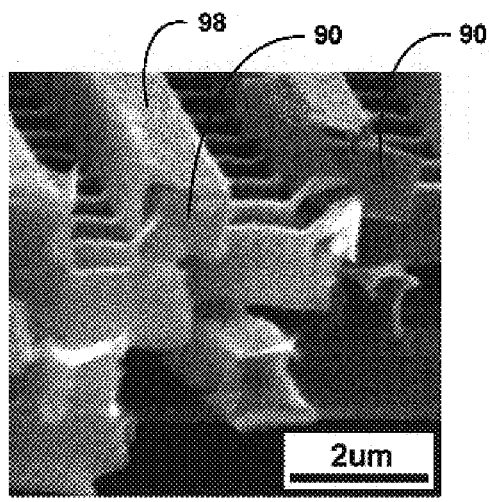
FIG. 12C
FIG. 12D

FABRICATION OF LAYER-BY-LAYER PHOTONIC CRYSTALS USING TWO POLYMER MICROTRANSFER MOLDING

STATEMENT REGARDING FEDERALLY SPONSORED RESEARCH OR DEVELOPMENT

This invention was made in part with Government support under DOE Contract No. W-7405-Eng-82. The government has certain rights in this invention.

FIELD OF THE INVENTION

The present invention relates generally to photonic band gap devices and methods of manufacturing same, and more particularly to a photonic crystal structure suitable for use in the optical wavelength region and a method of manufacturing same.

BACKGROUND OF THE INVENTION

Photonic crystals (PhCs) are periodic dielectric or metallic structures that exhibit frequency regions, called photonic band gaps (PGBs), in which electromagnetic waves cannot propagate. The interest in PhCs arises from the fact that photon behavior in a dielectric structure is similar to the behavior of electrons in a semiconductor. The periodic arrangement of atoms in a semiconductor lattice opens up forbidden gaps in the energy band diagram for the electrons. Similarly in all-dielectric PBG structures, the periodic placement of dielectric "atoms" opens up forbidden gaps in the photon energy bands.

The idea of PhCs has led to the proposal of many novel applications at optical wavelengths, such as energy-efficient light emitters, thresholdless lasers, single-mode light-emitting-diodes and optical wave guides. In addition, PhCs are already being used in the millimeter and microwave regimes, where the applications include efficient reflectors, antennas, filters, sources and wave guides. They have also found possible applications as infrared filters.

The PhCs behave as ideal reflectors in the band gap region. Depending on the directional periodicity of these dielectric structures, the band gap may exist in 1-D, 2-D or all the three directions. Various lattice geometries were studied to find a periodic structure that would exhibit a PBG in all the directions. After several unsuccessful attempts in finding the right lattice geometry using "trial-and-error" techniques, researchers at Iowa State University were first to predict the existence of complete PBGs in a periodic dielectric structure arranged in diamond lattice geometry. Diamond lattice structures were calculated to have large gaps for a refractive index ratio between the two dielectrics as low as two.

After the initial research into the existence of photonic band gaps, there was an increased effort to find structures that could be more easily fabricated. These fabrication techniques include creating the PhC through emulsions, with carbon structures, and by creating crystals by a liquid-phase chemical reaction to infiltrate a polystyrene template. Another fabrication technique is the use of microfabrication techniques since these techniques permit fabrication of three-dimensional (3D) devices with functionality not possible in planar devices. Traditional fabrication methods using photolithography are usually slow and costly and are a barrier to the commercialization of PhCs. Over the last few years, a number of approaches for fabricating 3D microstructures have been reported as alternatives to conventional photolithography such as microtransfer molding, two-photon polymerization, holographic lithography, and nanoimprinting. Among these approaches, microtransfer molding showed a number of advantages, including low cost, capability for non-periodic 3D structures, a wide range of materials compatibility, and flexibility in design.

In conventional microtransfer molding, a liquid prepolymer fills microchannels formed on the surface of an elastomeric mold. The prepolymer is solidified after bringing the mold into contact with a substrate. Then, the structure is transferred to the substrate by removing the flexible mold. In spite of the many advantages of conventional microtransfer molding, uncured filled prepolymer can smear out of the channels by capillary wicking when contacting a substrate. This wicking deteriorates structural fidelity and requires an additional processing step to remove the uncontrolled polymer, such as reactive-ion etching. Partial curing of filled prepolymer is effective in avoiding capillary wicking in the elastomeric mold since the partial curing increases the viscosity of the prepolymer; however, uncured prepolymer is still favored to ensure sufficient bonding strength with the substrate and/or other layers.

BRIEF SUMMARY OF THE INVENTION

Maximizing bonding strength, while minimizing the capillary wicking, is one of the most demanding technical challenges of such systems. The instant invention overcomes at least some of the aforementioned and other known problems existing in the art. More particularly, the instant invention provides a method of manufacturing a photonic crystal and the like allowing operation in the optical region. Furthermore, the instant invention provides a method of manufacturing PhCs utilizing micro-transfer molded structures.

The PhCs resulting from the method of manufacturing of the instant invention have characteristics of simple high pass filters, band stop filters, or filters having more complex transmission characteristics in the optical region depending upon the periodic pattern of the grids. Furthermore, it is a feature of the instant invention that the PhCs resulting from the method of the instant invention are lightweight and compact.

In accordance with an embodiment described herein, a method of manufacturing a PhC operable in the optical region comprises the steps of: filling a plurality of grooves of an elastomeric mold with a first polymer that can be UV cured, each groove in the plurality of grooves in parallel with each other; partially curing the first polymer; coating a second polymer on the first polymer, resulting in a filled elastomeric mold; placing one of a substrate or a multi-layer polymer structure on the filled elastomeric mold; exposing the one of the substrate or the multi-layer polymer structure and the filled elastomeric mold to UV light; peeling the filled elastomeric mold away from the first polymer and the second polymer such that the first polymer and second polymer form a polymer layer of polymer rods on the one of the substrate and the multi-layer polymer structure; and forming the multi-layer polymer structure by repeating the above steps until a desired number of polymer layers have been formed.

The first and second polymers are suitable polymers of appropriate viscosity and with physical and chemical properties that allow the building of a layered structure and cured via UV light exposure.

In accordance with a further embodiment described herein, the polymer layers of the multi-layer polymer structure are aligned by performing the steps of: pointing a light source at an initial layer and a second layer stacked on the initial layer at an approximately ninety degree angle to initial layer and determining if a resulting first order diffracted moire fringe (first-DMF) pattern matches a pattern of an aligned structure. If the resulting first-DMF pattern is not the pattern of an aligned structure, the second layer is moved until the resulting first-DMF pattern matches the pattern of an aligned structure. Subsequent layers are aligned by shining a light source through the multi-layer polymer structure and moving the subsequent layers of the multi-layer polymer structure until a first-DMF pattern matches the pattern of an aligned structure for the same number of layers.

In one embodiment, the PhC is formed with layers of rods stacked on top of each other, each layer having its axes oriented at 90° with respect to adjacent layers, alternate layers having their axes parallel to each other with the rods of one layer in offset between the rods of the other layer forming a three-dimensional structure of stacked layers having a four-layer periodicity, the dielectric rods arranged with parallel axes at a given spacing to form a planar layer and arranged in a material having a different and contrasting refractive index, the dimensions of the rods, the spacing between the rods and the refractive contrast of the materials selected to produce photonic band gaps operable in the optical region made by the method of the instant invention.

In one embodiment, the multi-layer polymer structure is used to create a full metallic PhC that can be used, for example, as an energy efficient light emitting device. A multilayer polymer template is fabricated on a conducting substrate such as indium-tin-oxide (ITO)-coated glass using the techniques described herein. The conducting substrate plays the role of a cathode in electroplating. An electroplating solution for copper or nickel is used, depending on whether the metallic structure being created is copper or nickel. After backfilling the internal space of the polymer template with copper or nickel by electroplating, the metal-backfilled template is separated from the conducting substrate. The separated template is immersed into an etching solution to remove the multi-layer polymer structure. The etched structure is rinsed in distilled water and isopropyl-alcohol and dried, thereby creating the full metallic PhC.

In another embodiment, the multi-layer polymer structure is used to create a ceramic photonic crystal. The multilayer polymer structure is fabricated on a photoresist coated substrate. Ceramic in the form of Titania slurry or the like is infiltrated into the multilayer polymer structure. A second substrate is bonded to the top surface of the infiltrated structure via a polyurethane layer. The photoresist is removed to separate the ceramic-infiltrated structure from the first substrate and the resulting structure is dried and fired to create a ceramic PhC.

In the other embodiment, the multi-layer polymer structure is used to create a free-standing metal-coated PhC. The multilayer polymer structure is fabricated on a thin-film coated glass. By dissolving the thin film, the multilayer polymer layer turns into a free-standing form. Metallic deposition, such as gold sputter deposition, through the top and bottom sides of the free-standing structure converts the multilayer polymer structure into a metallic PhC having the same characteristics of a full-metallic PhC.

Other advantages of the invention will become more apparent from the following detailed description when taken in conjunction with the accompanying drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The accompanying drawings incorporated in and forming a part of the specification illustrate several aspects of the present invention, and together with the description serve to explain the principles of the invention. In the drawings:

FIG. 8a is a moiré fringe photograph of a four-layered structure monitored by zeroth-DMF using the imaging configuration illustrated in FIG. 8c;

FIG. 8b is a moiré fringe photograph of a four-layered structure monitored by first-DMF using the imaging configuration illustrated in FIG. 8c;

FIG. 8c is an illustration of the imaging configurations used in the moiré fringe images of FIGS. 8a and 8b;

FIGS. 9b-9e are SEM micrographs corresponding to the mapping of first-DMFs of FIG. 9a;

FIGS. 10a-10d is a schematic illustration of a portion of the steps of creating a gold-coated three dimensional photonic crystal in accordance with the present invention;

FIG. 12a is a photograph of a tetragonal gold-coated photonic structure manufactured in accordance with the teachings of the present invention;

FIG. 12b is a photograph of a faced-centered-tetragonal four-layer gold coated structure manufactured in accordance with the teachings of the present invention;

FIG. 12c is a color optical transmission photograph of a four-layer gold coated structure manufactured in accordance with the teachings of the present invention;

FIG. 12d is a photograph of a cross-section image of a gold coated structure manufactured in accordance with the teachings of the present invention;

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
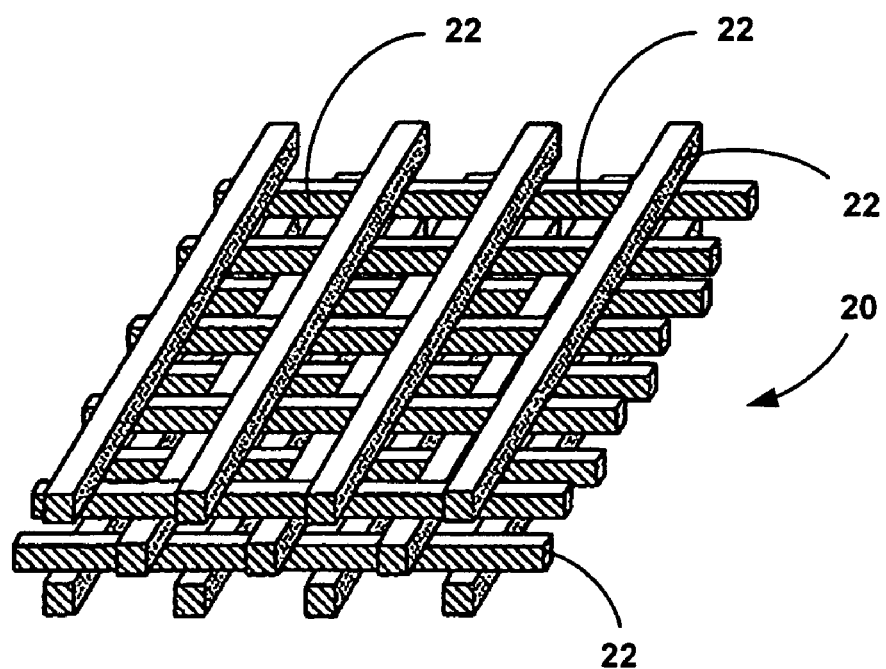
FIG. 1 is a simplified isometric illustration of a layer-by-layer PhC manufactured in accordance with the teachings of the present invention.

Turning now to FIG. 1, theoretical band calculations in conjunction with experimental measurements have firmly established that the structure 20 has a fundamental full PBG. This occurs between the lowest set of bands (i.e., bands 2 and 3). The structure 20 has a layer of rods stacked on top of each other. Each layer of rods consists of an ordered array of parallel rods 22, with a spacing d between rods 22. The axes of each layer are oriented at 90° with respect to adjacent layers. Alternate layers have their axes parallel to each other with the rods 22 of one layer in offset between the rods 22 of the other layer forming a three-dimensional structure of stacked layers having a four-layer periodicity The offset between alternate layers in one embodiment is half the spacing d (i.e., d/2). The rods 22 can be fabricated with dielectric or non-linear materials.

The methodologies described herein create highly layered microstructures using two polymers and have a residue- free filling method, sufficient bonding strength between layers for high yield, and extremely low capillary wicking for high structural fidelity. Two different UV-curable prepolymers are used as a filler and an adhesive to avoid the difficulties of conventional micro-transfer molding in which a single prepolymer performs both roles simultaneously.

Figure 2:
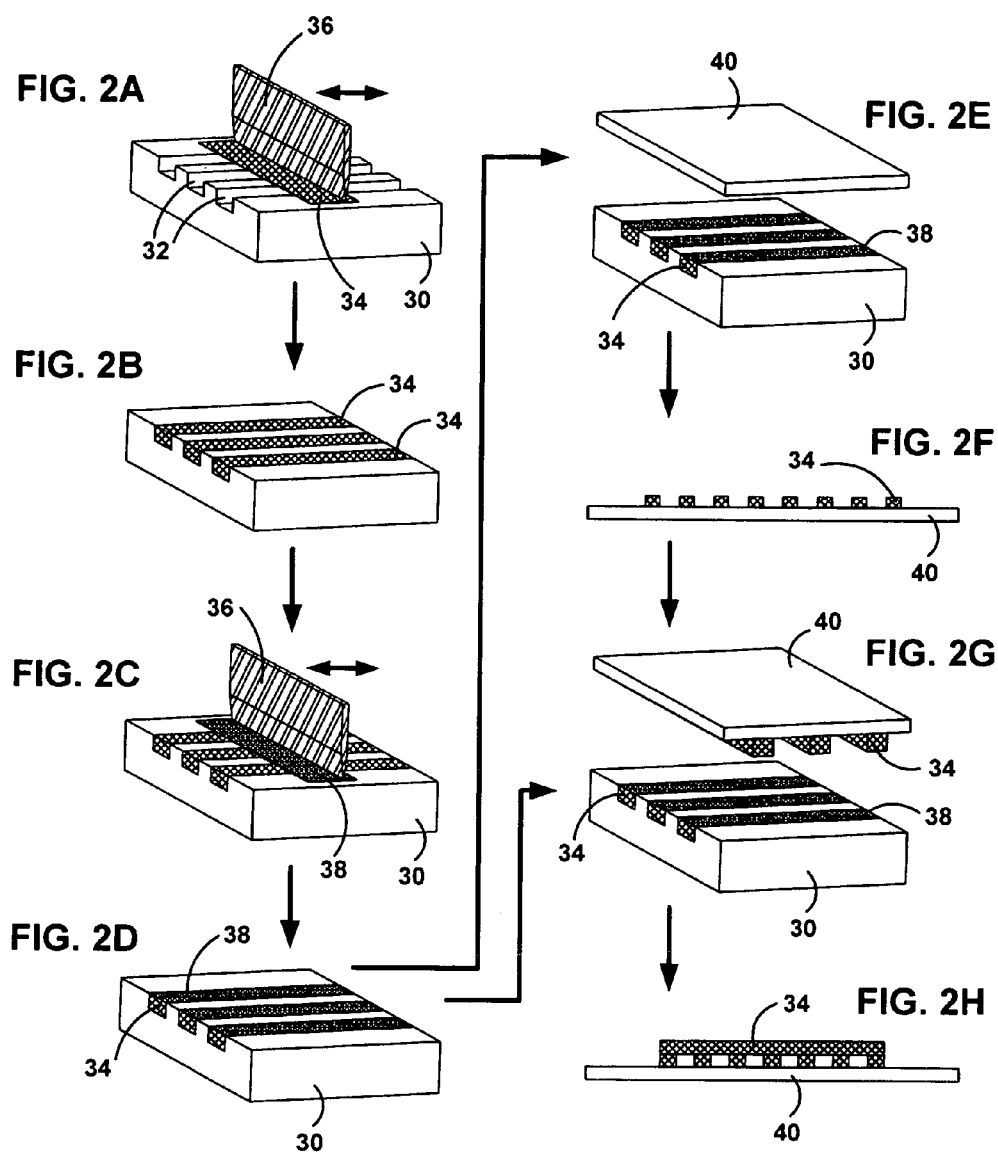
FIGS. 2a-2h are isometric illustrations of a portion of the steps to create layer-photonic by-layer phontonic structures in accordance with the teachings of the present invention.
Figure 3:
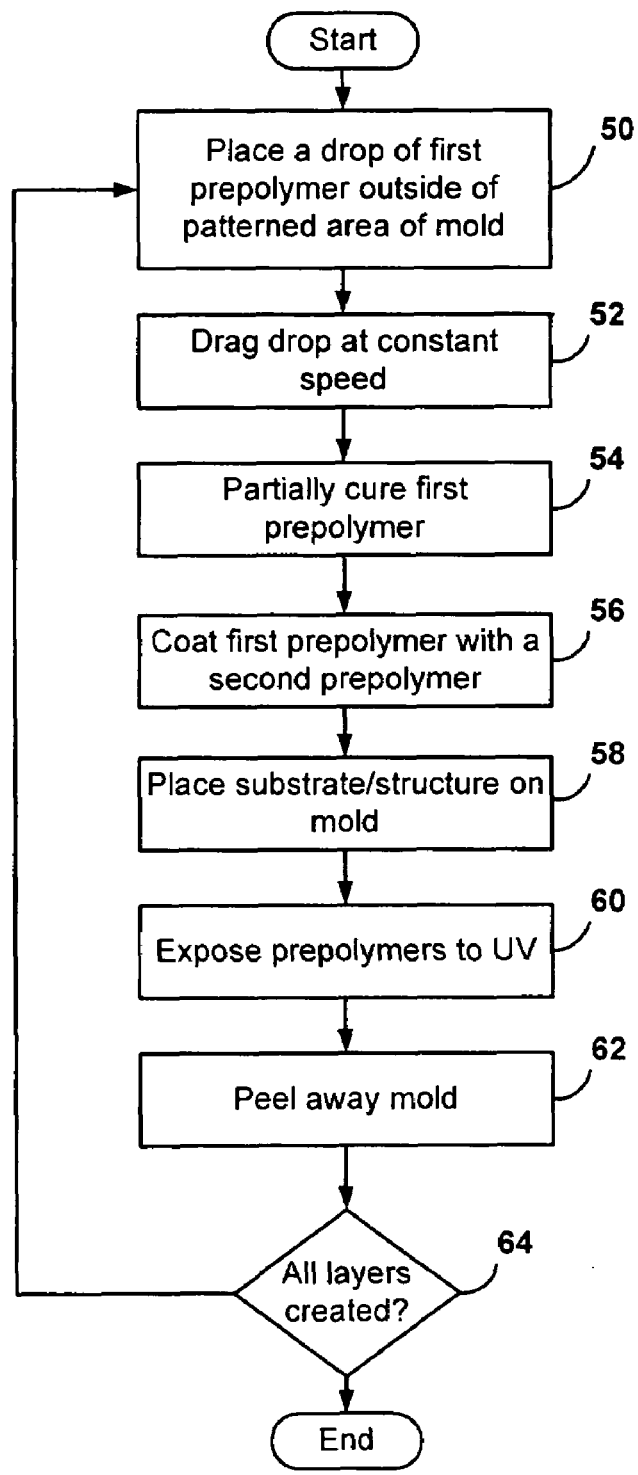
FIG. 3 is a flow chart illustrating the manufacturing process to create layer-by-photonic layer phontonic structures in accordance with the teachings of the present invention.

Turning now to FIG. 2 with reference to FIG. 3, the process of the present invention used to manufacture the photonic structures will be described. The three dimensional photonic structure is prepared in a multiple stage process. PDMS (poly-dimethylsiloxane) or other suitable elastomeric molds 30 cast from a master pattern out of a photoresist relief pattern on a silicon wafer are used in the manufacture of the photonic structures. Typically, the PDMS mold is created from a master pattern that usually only has parallel lines. However, it should be recognized that any pattern may be used for the master pattern. In one embodiment, the master pattern is made by spinning on a layer of photoresist on a silicon wafer. Photolithography or e-beam lithography is used to generate a multiple line pattern on the resist-covered wafer and the resist is developed, resulting in the master pattern. The PDMS mold is obtained by pouring PDMS on the master pattern. After the elastomeric mold is cured, it is peeled off of the master pattern, resulting in an elastomeric mold 30 having channels 32 reflecting the structure of the master pattern.

A drop of the first prepolymer 34 is placed just outside of a patterned area on a PDMS mold (step 50, see FIG. 3) and dragged at a constant speed (step 52) across the PDMS mold 30 with a blade 36 (see FIG. 2*a*). The blade 36 is not in contact with the PDMS mold 30. In one embodiment, the blade 36 is a metal blade controlled by mechanical actuators. After dragging through the patterned area, the prepolymer 34 only fills in the channels without any residue (see FIG. 2*b*). In the description that follows, this filling method will be referred to as "wet-and-drag" (WAD). In one embodiment, the speed for a forward movement (i.e. wetting) is around 0.5 mm/sec. The speed for a backward movement (i.e., dewetting) is around 30 μm/sec to achieve flat meniscus of the prepolymer 34 after filling while minimizing swelling of the PDMS mode by the prepolymer 34. Other speeds may be used. The filled prepolymer 34 is partially cured so it solidifies (step 54). In one embodiment, the UV dose for the partial curing of prepolymer 34 is within the range of 0.45 to 2.7 J/cm$^2$. The other prepolymer 38 is subsequently coated only on the prepolymer 34 by a second WAD (step 56) (see FIG. 2*c*), resulting in a filled PDMS mold 30 (see FIG. 2*d*). In one embodiment, the speed for a forward movement is around 0.5 mm/sec. The speed for a backward movement is around 100 μm/sec to minimize swelling of the PDMS mode by the prepolymer 38. Other speeds may be used. By placing a substrate 40 on the mold 30 (step 58) (see FIG. 2*e*) and exposing them to UV (step 60), the filled microstructure comprising polymer rods formed with prepolymer 34 and prepolymer 38 adheres to the substrate 40. The substrate 40 may be an indium-tin-oxide (ITO) glass. The PDMS mold 30 is peeled away (step 62) and the structure remains on the substrate 40 (see FIG. 2*f*). If all layers have not been created (step 64), the process is repeated until the desired number of layers has been built. By repeating the same sequential processes using a pre-stacked structure (e.g., the substrate and at least one layer of the structure) as a substrate (see FIG. 2*g*), structures of any number of layers can be fabricated (see FIG. 2*h*).

When the process is repeated for an additional layer, the additional layer is adhered on the previous layer of polymer rods such that the axis of the additional layer is oriented at an approximately ninety degree angle with respect to the axis of the previous layer of parallel polymer rods. Alternate layers are adhered such that the polymer rods have their axes parallel to each other with the polymer rods of one layer in offset between the polymer rods of the other layer. Alignment of layers is described hereinbelow. In one embodiment, the layers are stacked to form a three-dimensional structure of stacked layers having a four-layer periodicity.

Figure 4A:
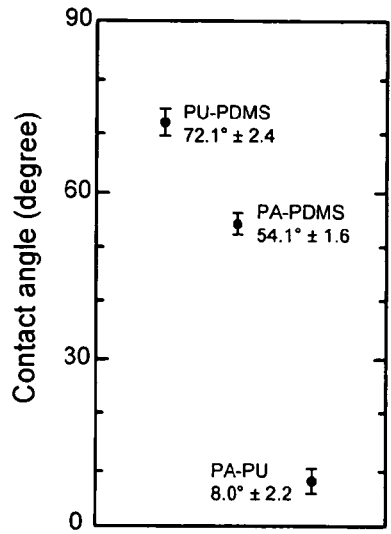
FIGS. 4a and 4b is a graphical illustration of the contact angle and phoholuminescence intensity of glue controlled by the UV dosage of the filler in accordance with the teachings of the present invention.
Figure 4B:
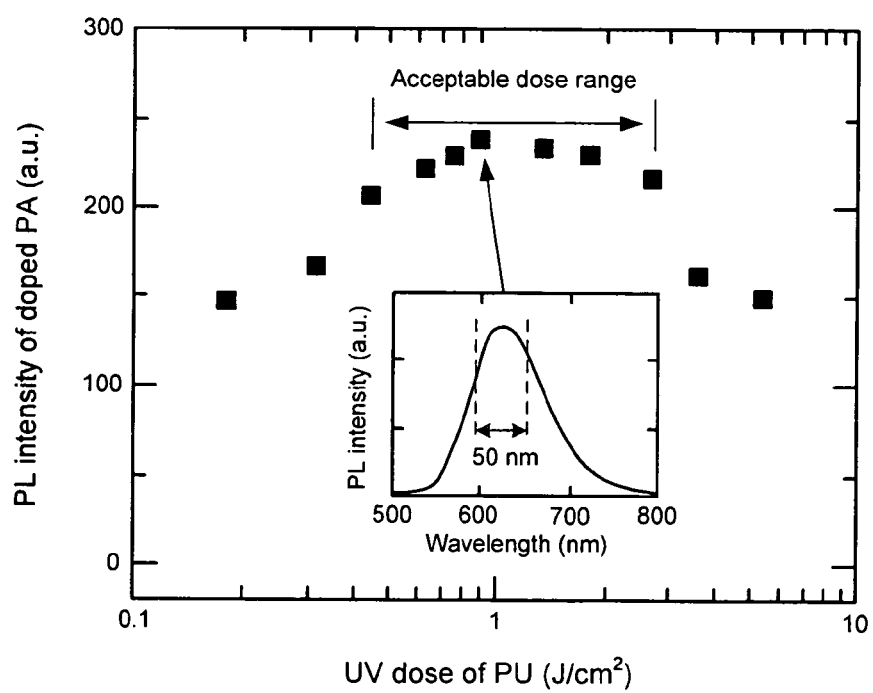

Turning now to FIGS. 4*a* and 4*b*, a number of UV-curable prepolymers were tested for the prepolymer 34 and it was determined that their viscosity affects the filling characteristics in WAD. For example, with patterned channels 1.4 μm wide and 1.1 μm deep, a polyurethane prepolymer, J-91 (Summers Optical), with a viscosity of around 300 cps, exhibits excellent filling characteristics. Lower or higher viscosity prepolymers caused uneven filling due to the rearrangement of the filled prepolymer within channels after WAD or formation of a thick layer over the channels, respectively. As a drop of polyurethane is moved from a non-patterned area into a patterned area, empty channels start to fill at a front boundary of the polyurethane drop and all channels underneath of the drop of polyurethane are completely filled. When the dragging of polyurethane is continued, dewetting of polyurethane on the top surface of the mold starts at the rear boundary of the polyurethane drop. However, channels are left filled behind the dewetting line because the adhesive energy of polyurethane to the patterned PDMS surface exceeds the cohesive energy of polyurethane.

Note that WAD is distinct from other coating methods using blades such as doctor blading in which the thickness of a film is related to the gap between a blade and a substrate. The role of the blade in WAD is to control the macro movement of the prepolymer and as a result, filling properties are determined by the properties of the polymers and the shape of patterns formed on a mold, and not by the gap or the speed of the blade. The gap in one embodiment is around 0.2 mm for better control of the movement of polyurethane, and this value is about 200 times larger than the depth of channels being filled. This spontaneous dewetting characteristic allows WAD to produce residue-free filling and to avoid any physical damage or distortion of the PDMS mold by direct contact of the blade. When high-pressure nitrogen is used to remove excess prepolymers, tiny scattered droplets of prepolymers were observed after blowing, which are very difficult to remove even using higher velocity nitrogen. In contrast, residual prepolymer was not observed in the case of WAD. This may be because of the relatively low ability of polyurethane to wet a non-patterned surface of PDMS (contact angle of around 72°). Although the range of applicable prepolymers is limited by the requirement of spontaneous filling, WAD can be complementary or alternative to other filling methods like scraping with a PDMS block, blowing off excess with inert gas, or conventional doctor blading. A dragging speed of around 30 μm/second is selected because faster or slower speeds was found to cause a separation of prepolymer from the blade or more swelling of PDMS by polyurethane, respectively. A single WAD of polyurethane is sufficient to achieve residue-free, even filling through the entire 4 mm×4 mm square area in the patterned mold used. This filling method is expected to be scalable to smaller dimensions.

For the polymer 38, a polymethacrylate prepolymer (PA), SK-9 (Summers Optical), is used, because PA satisfies several requirements as a bonding material: very low viscosity (80-100 cps) to form a thin layer; sufficient bonding strength to polyurethane and glass; and a large surface-energy difference between PDMS and polyurethane. Other polymers may be used with similar characteristics. The contact angles of PA on polyurethane and PDMS are 8° and 54°, respectively. This difference provides the driving force for selective wetting. The second WAD with PA is performed on the polyurethane-filled PDMS mold after solidifying polyurethane by UV exposure. In WAD of PA, the gap of the blade is fixed at the same value, 0.2 mm, but the dragging speed is increased to 100 μm/second to minimize the swelling of PDMS by PA. The faster dragging speed is possible by virtue of the low viscosity of PA. Interestingly, a self-healing characteristic of WAD for PA was observed. The self-healing is achieved as more PA adheres around local defects on the polyurethane surface. With the increased quantity of PA, the bonding strength around defects is significantly reinforced, preventing possible adhesion failure of the structures being transferred. The self-healing is indispensable to reduce failures because it confines defect sites locally. Otherwise, in some cases the detached structures generate global defects in the transferring of the next layer by hindering contact.

Controlling the quantity of PA in the WAD process is important for high yield. Insufficient or excess PA causes poor adhesion or an undesirable layer between the transferred structure and the substrate. Since each single layer in a fabricated multilayer structure consists of a large number of polymer rods (e.g., 1600 in one embodiment), a transfer-error rate is defined as dividing the number of transfer-failed rods by the total number of rods to be transferred. In one embodiment, we set the acceptable transfer-error rate as $10^{-4}$. Other rates may be used. The transfer error rate is much higher than the acceptable transfer-error rate when the polyurethane filled in the PDMS mold is fully cured. We found that the transfer-error rate can meet the acceptable transfer-error rate by reducing the UV-exposure time of the polyurethane. We theorize that dangling bonds in the polymer-network of the partially cured polyurethane helps retain more PA. To determine the correlation between the UV dose for curing polyurethane and the amount of coated PA, a red dye (i.e., LDS 698, Exciton) was added to PA. An assumption was made that the intensity of photoluminescence from the doped dye is linearly proportional to the quantity of PA when the doping concentration of the dye is low ($6\times10^{-3}$ wt.-%). The dye doping does not appear to affect the functionality of the PA. After preparing polyurethane-filled molds where the filled polyurethane is exposed to different UV doses, WAD is performed with the dye-doped PA. Then, the photoluminescence intensities are measured, exciting the dye with an argon-ion laser ($\lambda$=514 nm).

The correlation between the intensity of photoluminescence and the UV dosage is shown in FIG. 4a. All photoluminescence spectral values within a 50 nm range around the photoluminescence peak were averaged as shown in FIG. 4b. The relationship between the PA quantity and UV dosage to the polyurethane is not monotonic; the intensity of photoluminescence shows a maximum at 0.9 J cm$^{-2}$. Dosages less than 0.2 J cm$^{-2}$ were not considered because polyurethane is apparently miscible with PA under an optical microscope when the dosage is less than 0.2 J cm$^{-2}$, showing polyurethane still has much fluidity which would result in capillary wicking and structural deterioration at these lower dosages.

The transfer yield was sufficiently high to stack highly layered microstructures while satisfying the acceptable transfer-error rate for the dosage ranging from 0.45 to 2.7 J cm$^{-2}$. For doses outside this range, the transfer yield drops precipitously. In the acceptable range, the minimum dose, 0.45 J cm$^{-2}$, is considered the optimal UV dose for two polymer micro-transfer molding because excess PA may result in an undesired thin film on a substrate, and a shorter curing time is better for reducing total process time. Note that the UV dose only represents the incoming dose from a UV source, not including the UV dose from reflected UV light by the interfaces of materials. The asymmetric photoluminescence spectrum in FIG. 4b is mainly due to a low-pass filter, having a cut-off wavelength of 550 nm, used for blocking the excitation laser light.

If the area of PA application is wider than the area of transferred structures, it will hinder further processing. For instance, the excess film will hinder selective etching of substrates or electrodeposition using conducting substrates. To investigate the structure of the PA film and its bonding characteristics, a two-layer structure on a glass substrate was fabricated that was first coated with a water-soluble polymer. The dosage on polyurethane was 0.45 J cm$^{-2}$. By dissolving the water-soluble polymer with distilled water, the two-layer structure was easily separated from its substrate, resulting in a free-standing form of the structure. The SEM images of the bottom surface of the separated structure indicate that each bar shows quite clear edges without excess material. Interestingly, circular patterns, which were not observed before the WAD of PA were found at the bonding surface. Presumably, these patterns originated from air captured in making sudden contact with a substrate or the contraction of PA in curing. The flat disk-shaped remnants observed confirm that the filled polyurethane had lost its fluidity when placed on the substrate; otherwise hemispheric patterns would have been formed. From the patterns, one can infer that the PA coating is uniform and very thin as compared to the height of the polyurethane bars.

Figure 5A:
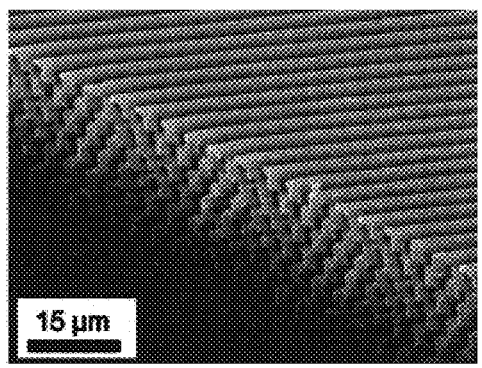
FIGS. 5a-5d are scanning electron microscope (SEM) micrographs of photonic structures manufactured in accordance with the methodology illustrated in FIGS. 2a-2h and 3.
Figure 5B:
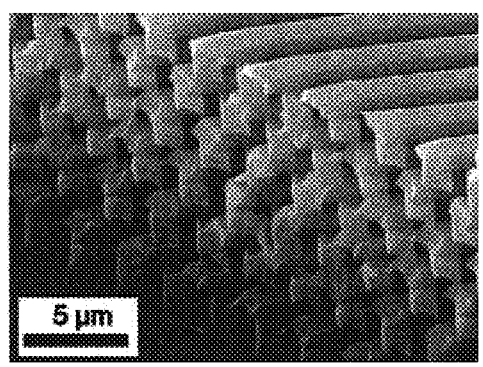
Figure 5C:
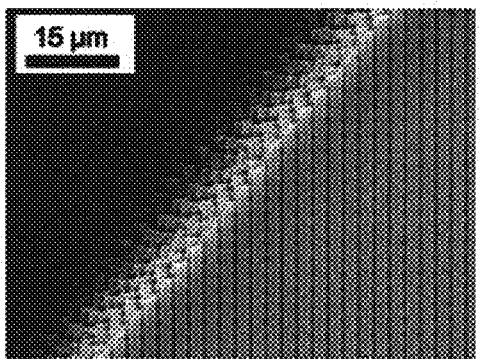
Figure 5D:
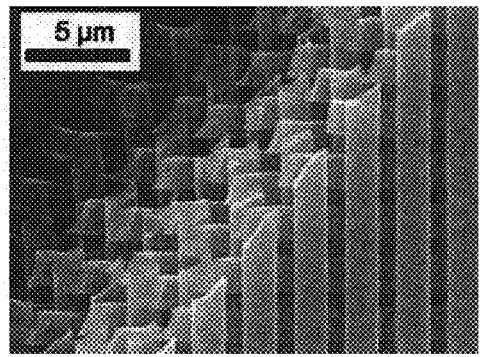

To demonstrate the feasibility of two polymer micro-transfer molding for highly layered microstructures, a 12-layer structure was fabricated and is shown in FIGS. 5a-5d with the minimum acceptable dose, 0.45 J/cm$^2$. FIG. 5a is a tilted view of the structure and FIG. 5c is the top view of the structure. FIGS. 5b and 5d are higher magnifications of FIGS. 5a and 5c, respectively. The area of the fabricated structure was 4 mm×4 mm and the orientation of each layer was perpendicular to the one below. After fabrication, the 12-layer structure was cut along a 45° line to the orientation of each layer with a razor blade. The multilayer microstructure sustained this cutting with minimal damage, indicating a high bonding strength. Indeed, the high bonding strength is quite critical in the micro-transfer molding technique because every bonding site of pre-stacked layers undergoes tensile stress whenever a PDMS mold is peeled away in transferring additional layers. Weakly bonded layers can debond at any stage in subsequent processing. The successfully fabricated 12-layer structure in FIGS. 5a-5d indicates that each layer had sufficient bonding strength to withstand subsequent processing.

Note that the multilayer fabrication by using soft materials such as PDMS would have inherent limits in accuracy due to the irregular distortions of the soft materials used in processing. The distortion in the two polymer micro-transfer molding techniques was investigated by using moiré-fringes metrology, and the relative pattern mismatch was less than ±0.5 µm/mm. Although the inaccuracy from the distortions may limit the applications of the two polymer microtransfer molding techniques for large-area high-accuracy devices, it is still tolerable for many other applications.

The two polymer microtransfer molding provides a route for the fabrication of highly layered microstructures with high yield and high structural fidelity. The techniques described herein improve the consistency of the fabrication processes by controlling the UV dosage for the photocurable prepolymers. The use of two different photo-curable prepolymers, a filler and an adhesive, allows for fabrication of layered microstructures without thin films between layers. The difference in surface energies between the polymers allows filling and selective coating of the two prepolymers with self-healing properties. Applying two different prepolymers enables a user to separate the bonding and the structural functions accomplished by a single prepolymer in conventional microtransfer molding. By separately controlling the chemistry and application of the prepolymers, we achieved both high bonding strength and extremely low capillary wicking. Moreover, exact filling without residues and selective coating of the prepolymer, relying on the differences in the surface energies, are efficiently achieved by WAD.

Turning now to FIGS. 6a-9e, the alignment of band gap layers can be tricky due to the size of the polymer rods. The rods in a photonic band gap such as those shown in FIG. I look like grids when viewed in several directions (e.g., in the x, y, and z axis). The direct way to align layers is to see the grid in the layers in one direction (e.g., in an x axis) and in an other direction (e.g., in a y axis) and align the layers by arranging the grids. The rods cannot be seen in detail with optical microscopy because the width of the rods is below the resolution of an optical microscope. A SEM can be used to see the rods. However, the rods cannot be moved when using a SEM. As a result, neither the optical microscope nor the SEM is very effective by themselves to align the layers. The alignment and layer distortions can be imaged through the use of moiré patterns using visible light. The 1st-order diffracted moiré fringes (first-DMF) of transparent multilayered structures comprised of irregularly deformed periodic patterns were studied. By a comparison study of the diffracted moire fringe pattern and detailed microscopy of the structure, it can be seen that the diffracted moire fringe (DMF) can be used as a nondestructive tool to analyze the alignment of multilayered structures. During formation of a multi-layered structure, the first-DMF of the structure can be compared to what the first-DMF of an aligned structure should look like and the layer being added to the structure can be moved until the first-DMF of the structure looks like an aligned first-DMF pattern. The alignment method yields high contrast of fringes even when the materials being aligned have very weak contrasts.

Figures 6A, 6B:
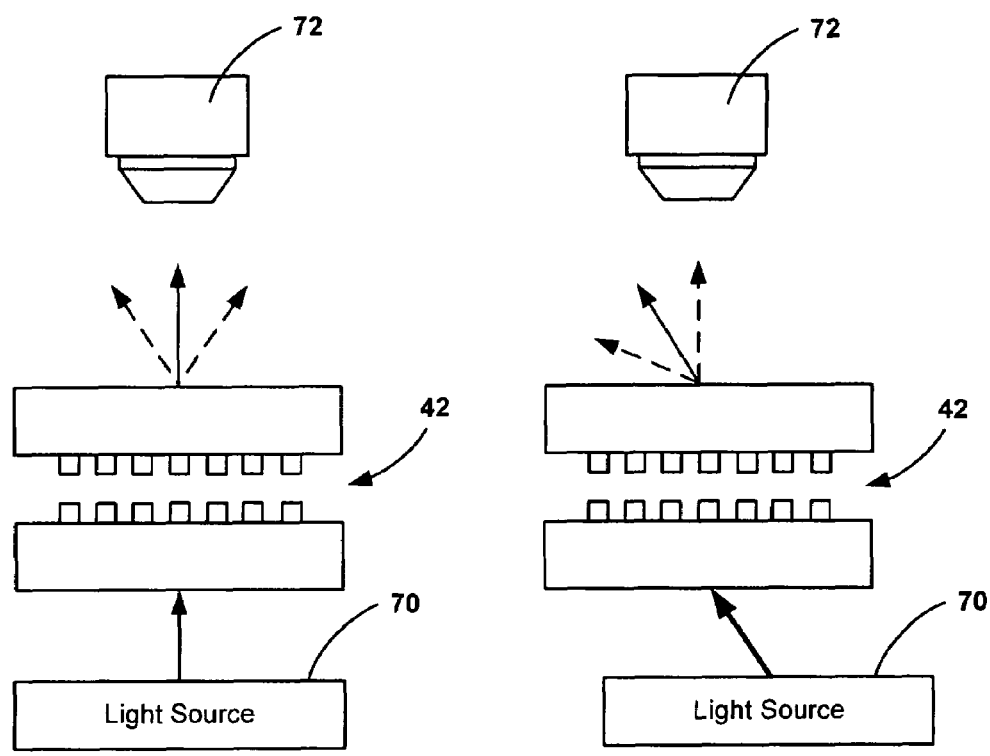
FIG. 6a is a schematic illustration of the configuration for a zeroth-diffracted moiré fringe (DMF) imaging technique.
FIG. 6b is a schematic illustration of the configuration for a first-DMF imaging technique.

Turning now to FIG. 6a, a zeroth-DMF is acquired by pointing a light source 70 at the multilayered structure 42 along an axis of the polymer rods and monitoring the moiré fringe with a detector 72. Similarly, a first-DMF is acquired by pointing a light source 70 at the multilayered structure 42 at an angle with respect to the first-DMF position (e.g., 45 degrees) and monitoring the moiré fringe with a detector 72 (see FIG. 6b).

Figure 7A:
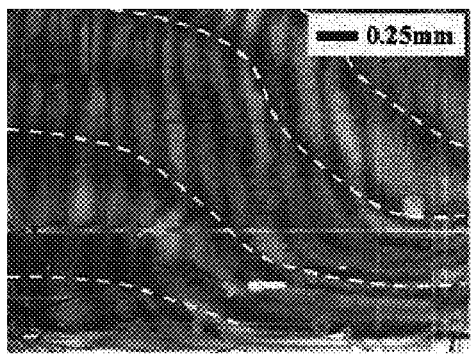
FIG. 7a is a moiré fringe photograph of a four-layered structure monitored by zeroth-DMF using the imaging configuration illustrated in FIG. 7c.
Figure 7B:
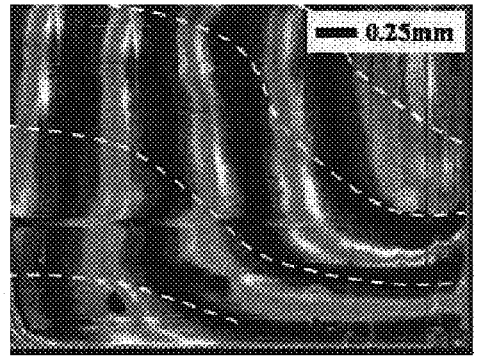
FIG. 7b is a moiré fringe photograph of a four-layered structure monitored by first-DMF using the imaging configuration illustrated in FIG. 7c.
Figure 7C:
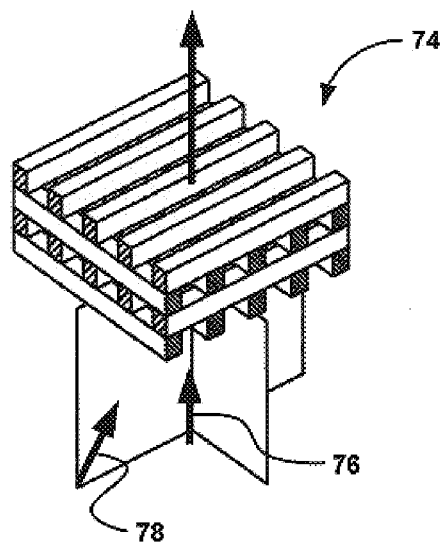
FIG. 7c is an illustration of the imaging configurations used in the moiré fringe images of FIGS. 7a and 7b.

Turning now to FIGS. 7a-7c, an example of the moiré fringes for a four layered gating structure 74 (see FIG. 7c) are shown. FIG. 7a is an image of the moiré fringes of the four layered gating structure 74 monitored by a zeroth DMF (represented by arrow 76 in FIG. 7c). FIG. 7b is an image of the moiré fringes of the four layered gating structure 74 monitored by a first DMF (represented by arrow 78 in FIG. 7c). The white dashed lines represent boundaries of color domains in the first-DMF.

A further example of the moiré fringes is shown in FIGS. 8a-8c. These moiré fringes are for a three layer structure 80 located 50 µm above a filled PDMS mold 30. FIG. 8a is an image of the moiré fringes of the configuration 82 monitored by a zeroth DMF (represented by arrow 76 in FIG. 8c). FIG. 8b is an image of the moiré fringes of the configuration 82 monitored by a first DMF (represented by arrow 78 in FIG. 8c). The solid and dashed lines in the images are along preformed and newly formed fringes, respectively.

Figure 9A:
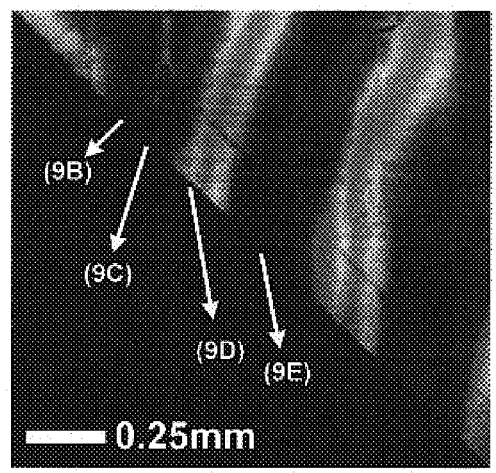
FIG. 9a is a color photograph of the mapping of first-DMFs generated by the first and third layers of a four layered structure to the corresponding SEM micrographs of the structures illustrated in FIGS. 9b-9e.
Figure 9B:
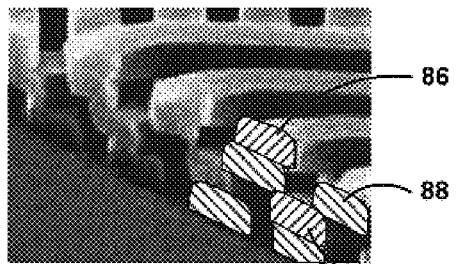
Figure 9C:
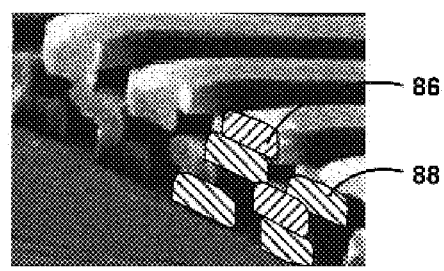
Figure 9D:
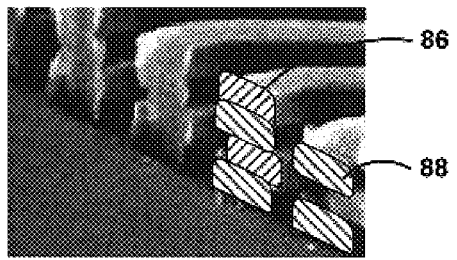
Figure 9E:
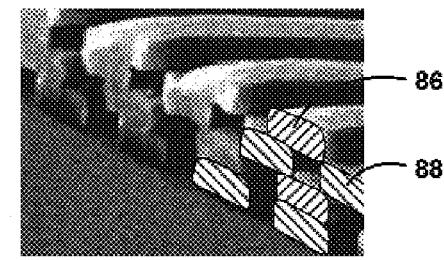

Turning now to FIGS. 9a-9e, the mapping of first-DMFs, generated by the first and third layer of a four-layered structure, to their corresponding SEM micrographs is shown. The first and third layers are labeled as reference number 88 and the second and fourth layers are labeled as reference number 86 in the micrographs of FIGS. 9b-9e. FIG. 9b corresponds to the 9b label in FIG. 9a, FIG. 9c corresponds to the 9c label in FIG. 9a, FIG. 9d corresponds to the 9d label in FIG. 9a, and FIG. 9e corresponds to the 9e label in FIG. 9a.

Figure 11:
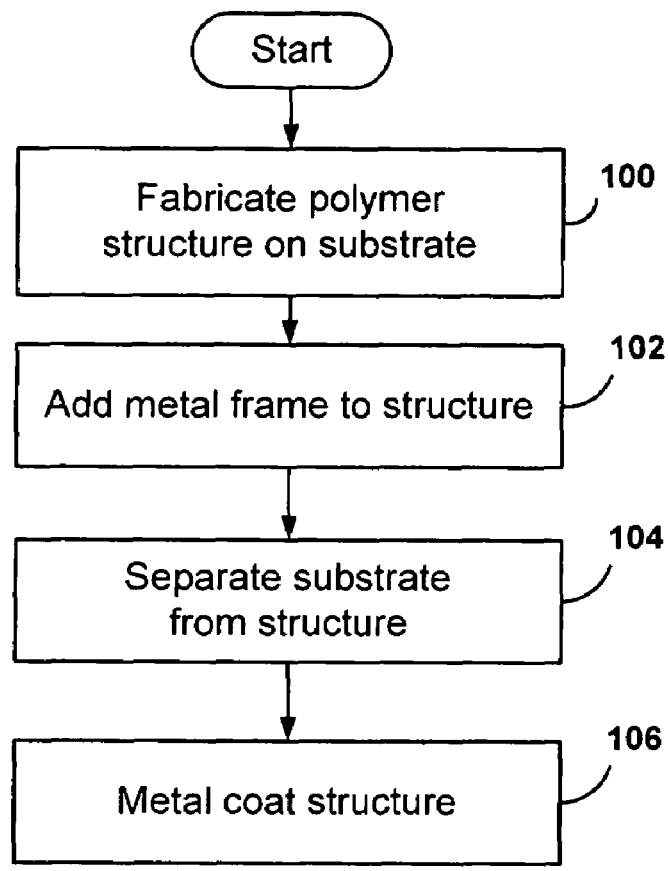
FIG. 11 is a flow chart illustrating the steps used to create the gold-coated three dimensional photonic crystal in accordance with the teachings of the present invention.

An efficient method of fabricating free-standing three-dimensional metallic photonic crystals uses the two-polymer microtransfer molding techniques. Low cost and ease of fabrication are achieved through gold sputter deposition on a free-standing woodpile polymer template. Turning now to FIGS. 10a-10d in conjunction with FIG. 11, this is accomplished by creating a multilayer polymer structure 90 as described above (see FIGS. 2a-h and 3) on a film coated substrate such as, for example, a water-soluble polymer 92 on glass 94 (step 100—see FIG. 11) as illustrated in FIG. 10a. A metal framing 96 is adhered to the structure 90 (see FIG. 10b) to ensure the rigidity of the structure 90 (step 102). The resulting structure (comprising structure 90 and frame 96) is separated from the substrate (step 104) as illustrated in FIG. 10c. This can be done by dissolving the water soluble layer (e.g., water-soluble polymer 92). The resulting structure is coated with metal 98 (step 106) by gold sputter coating through both the top and bottom sides of the structure with a tilted rotation to reduce deposition shade as illustrated in FIG. 10d. FIGS. 12a, 12b, and 12d are SEM micrographs of a four-layer gold coated free-stand structure. FIG. 12a is a tetragonal and FIG. 12b is a face-centered-tetragonal gold coated structure. FIG. 12d is a cross-section image of the gold coated structure where the polymer 90 and gold 98 can be seen. FIG. 12c is an optical transmission photograph of the structure of FIGS. 12a and 12b. The photonic crystals behave as full metallic structures with a photonic band edge at a wavelength of 3.5 µm. The rejection rates of the structures are about 10 dB per layer.

Figure 13A:
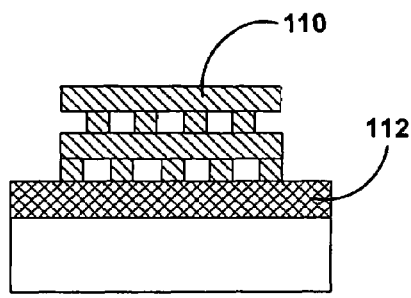
FIGS. 13a-f are schematic illustrations of a method to create titania PhCs using the methodology of FIGS. 2a-2h and 3.
Figure 13B:
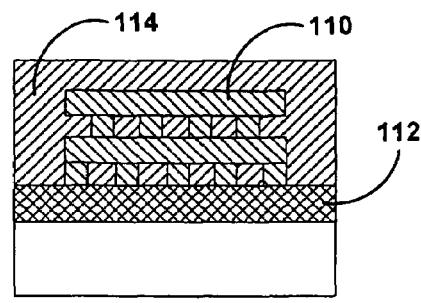
Figure 13C:
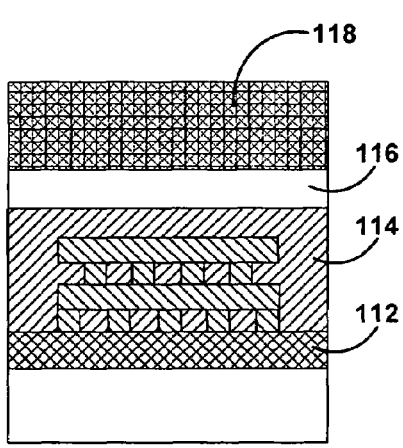
Figure 13D:
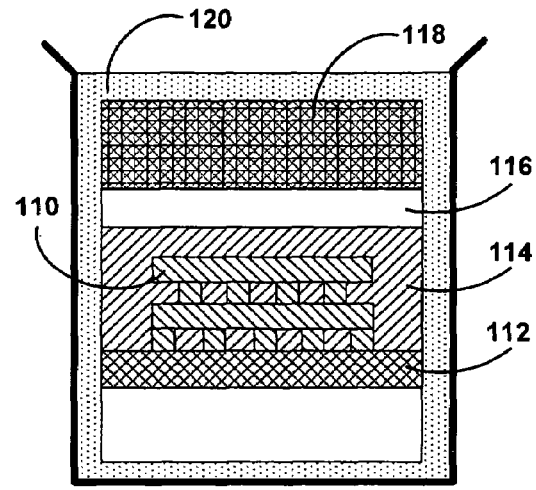
Figure 13E:
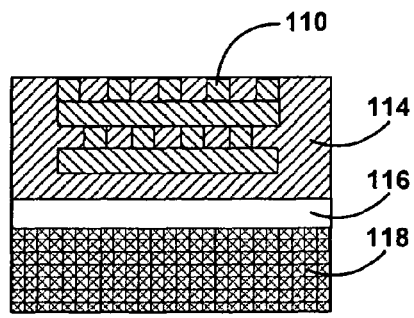
Figure 13F:
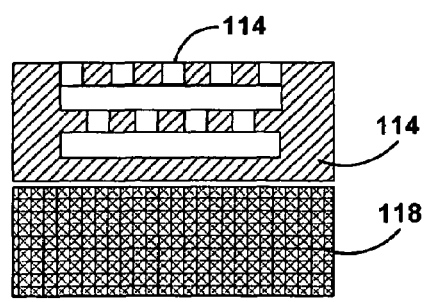
Figure 14:
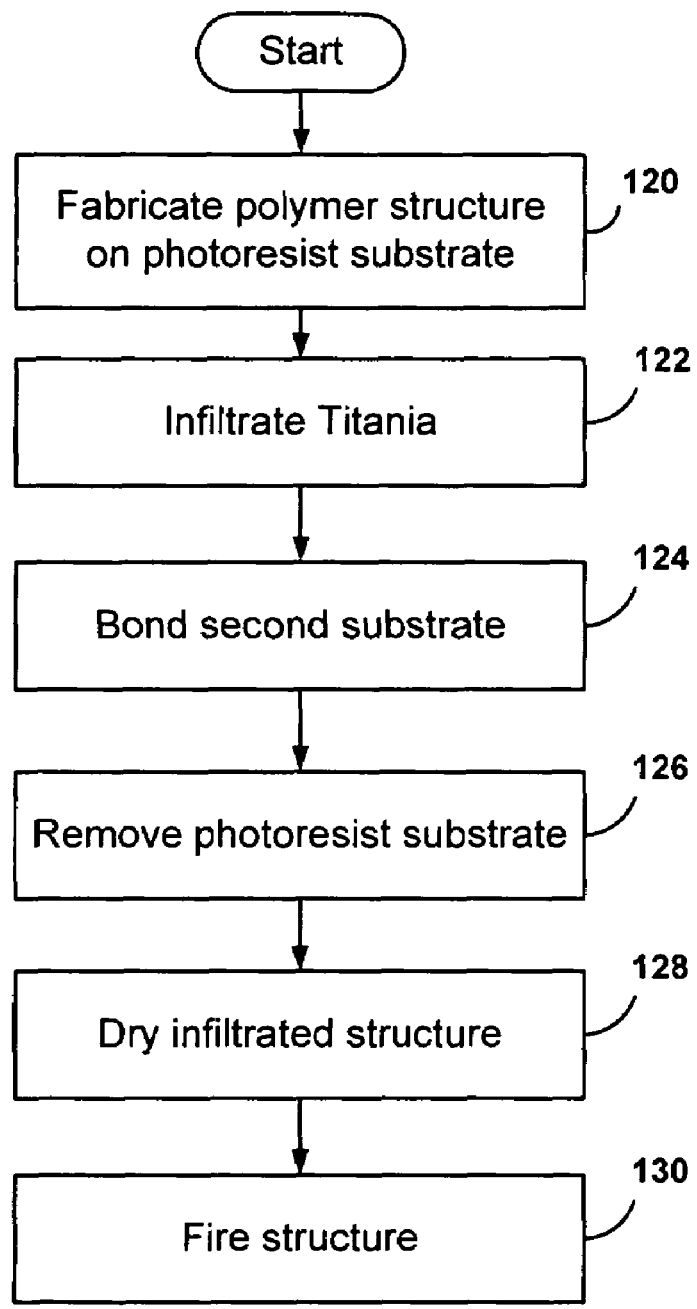
FIG. 14 is a flow chart illustrating the steps used to create the titania PhCs.
Figure 15A:
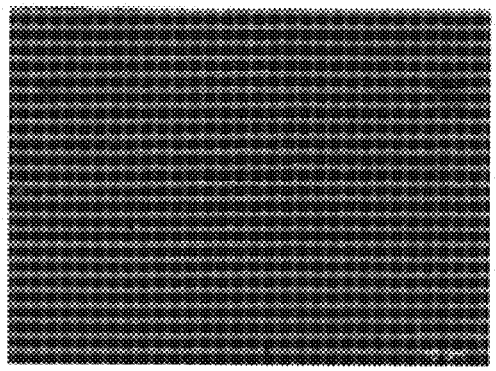
FIGS. 15*a* and 15*b* are SEM micrographs of titania PhCs manufactured in accordance with the teaching of the present invention.
Figure 15B:
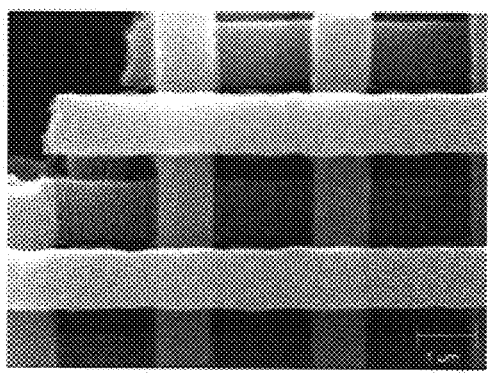
Figure 15C:
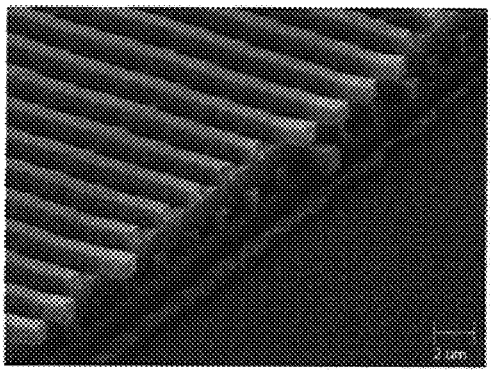
Figure 15D:
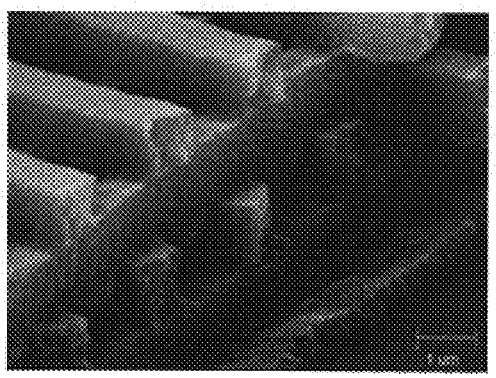

Turning now to FIGS. 13a-13e and 14, ceramic woodpile structures can be created by using ceramic infiltration of polymer templates. This is accomplished by creating a multilayer polymer structure 110 as described above (see FIGS. 2a-h and 3) on a photoresist coated substrate such as, for example, a photoresist 112 on glass (step 120—see FIG. 14) as illustrated in FIG. 13a. Ceramic in the form of titania slurry 114 or the like is infiltrated into the multilayer polymer structure 110 (step 122), as illustrated in FIG. 13b. Turning to FIG. 13c, a second substrate 118, such as silicon, is bonded to the infiltrated structure (step 124) via a polyurethane adhesive 116. Turning to FIG. 13d, the photoresist 112 is removed (step 126) by adding developer 120. The resulting structure illustrated in FIG. 13e is dried (step 128) and then fired (step 130) to create a ceramic photonic crystal 114 as illustrated in FIG. 13f. The ceramic infiltration technique for complex three-dimensional microstructures allows us to realize excellent structural fidelity and a low crack density. For example, FIGS. 15a-15d are SEM micrographs of a fabricated ceramic structure. FIG. 15a is a wide top view of the ceramic structure and FIG. 15b shows a top view of a face-centered-tetragonal ceramic PhC. FIG. 15c is a tilted image of a cross section of a ceramic structure and FIG. 15d is a magnified view of the cross-section of FIG. 15c. The fabricated photonic crystals have a photonic band gap at around 5 µm and agree well with theoretical calculations. Since the structure of the crystals is fully controllable, diverse applications are expected by implanting functional defects such as, for example, the defects disclosed in U.S. Pat. No. 6,555,406, hereby incorporated in its entirety.

Figure 16A:
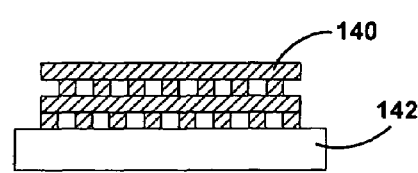
FIGS. 16*a*-*f* are schematic illustrations of a method to create full metallic PhCs using the methodology of FIGS. 2*a*-2*h* and 3.
Figure 16B:
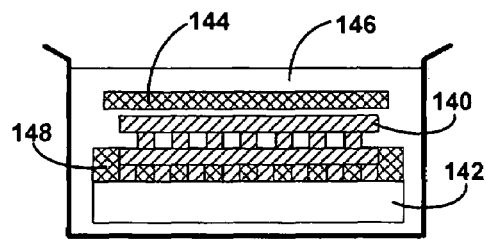
Figure 16C:
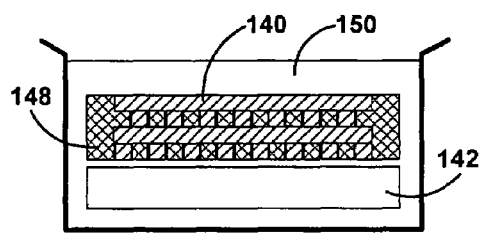
Figure 16D:
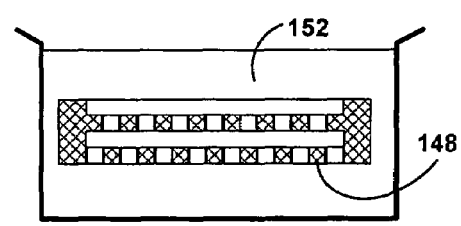
Figure 16E:
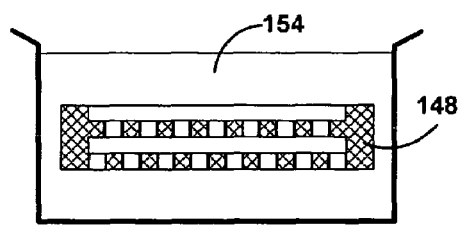
Figure 16F:
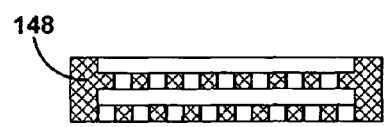
Figure 17:
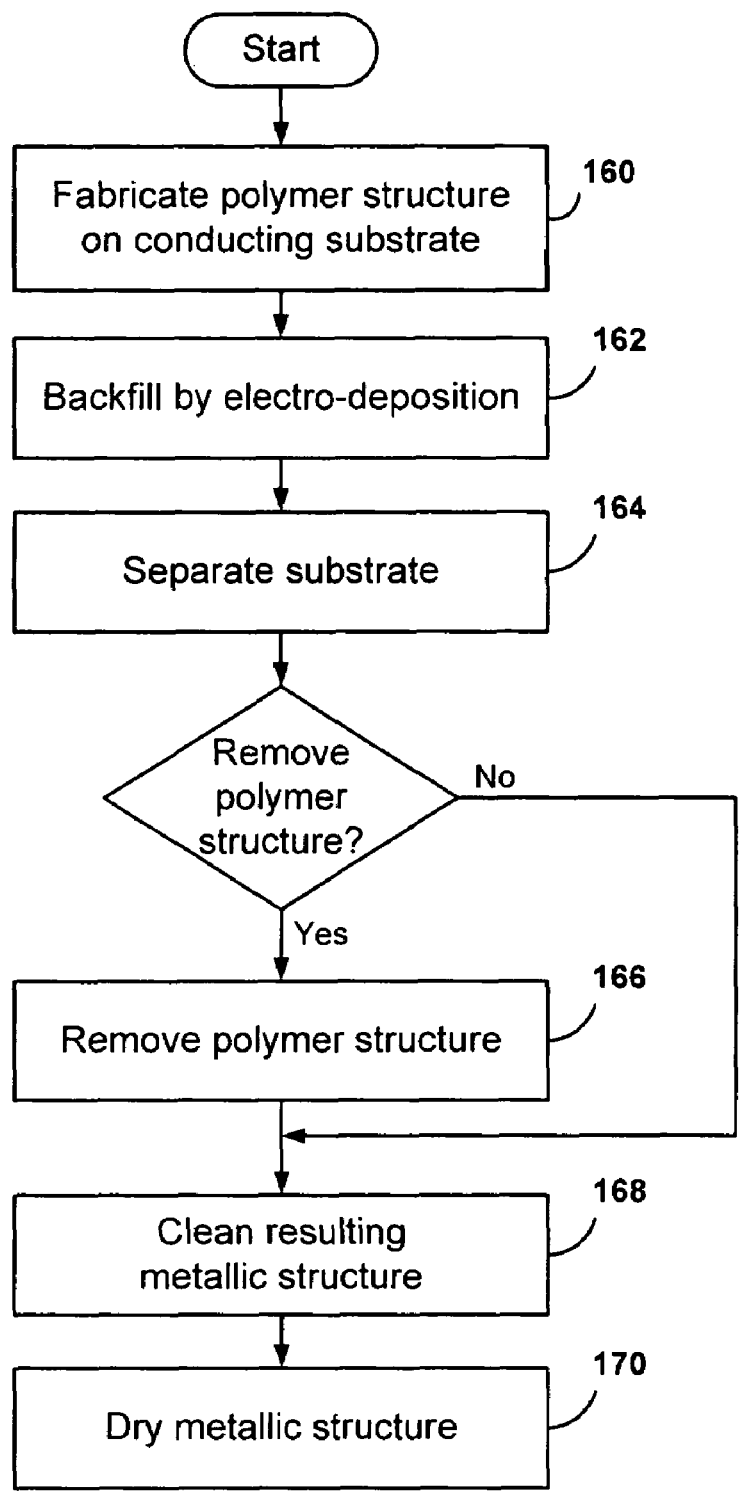
FIG. 17 is a flow chart illustrating the steps used to create the full metallic PhCs.
Figure 18A:
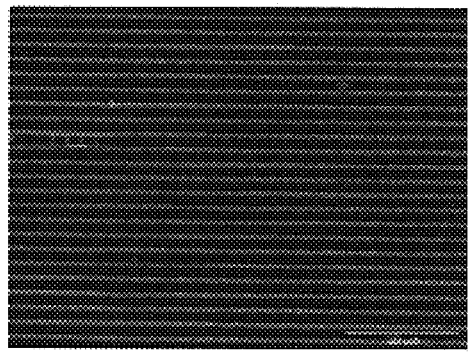
FIGS. 18*a*-18*d* are SEM micrographs of full metallic PhCs before and after etching in accordance with the steps illustrated in FIG. 17.
Figure 18B:
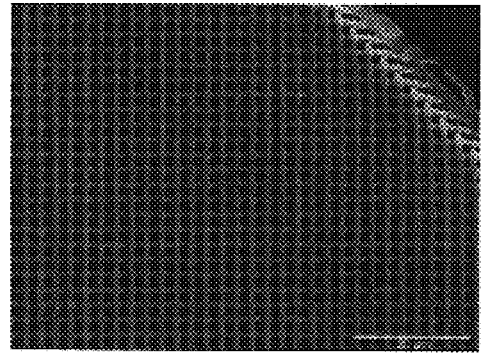
Figure 18C:
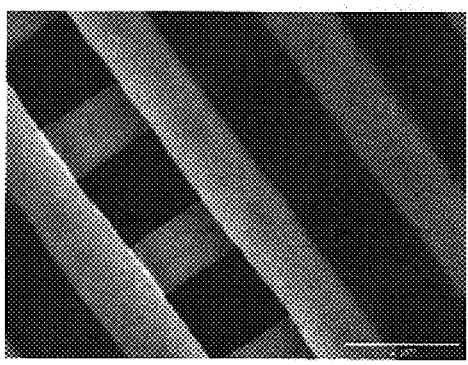
Figure 18D:
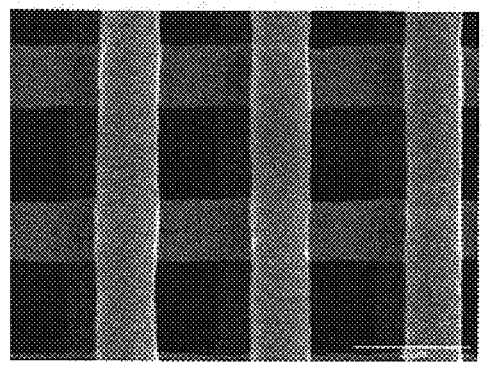

By combining the two-polymer microtransfer molding technique with commercially available electroplating techniques, full metallic PhCs can be fabricated at extremely low cost. The higher yield and fidelity in polymer template fabrication with the two-polymer microtransfer molding technique also reduces the fabrication cost. The full metallic PhCs are fabricated by backfilling the polymer structure with metals by electro-deposition and removed by chemical etching. One can create woodpile-like full metallic structures with the two-polymer microtransfer molding technique. This can be accomplished by creating a multilayer polymer structure 140 as described above (see FIGS. 2a-h and 3) on a conductive substrate 142 (step 160—see FIG. 17) as illustrated in FIG. 16a. In one embodiment, the conductive substrate 142 is an indium-tin-oxide (ITO)-coated glass. The structure 140 and conducting substrate 142 are placed in an electrolyte 146 and a voltage is applied to the conducting substrate and conductive element 144 placed above the structure 140. The conductive element 144 may be a copper plate or nickel plate, depending on whether the metal to be electro-deposited is copper or nickel. The structure 140 is backfilled (step 162), resulting in a metallic structure 148 between the polymer rods of the structure 140 (see FIG. 16b). Turning to FIG. 16c, the backfilled structure is separated from the conducting substrate 142 (step 164) with a suitable etchant 150. Alternatively, if the adhesion of copper and nickel to the conducting substrate is weak such as with an ITO-coated glass substrate, the backfilled structure can be removed from the substrate with simple mechanical separation such as peeling the backfilled structure off of the substrate. Turning to FIG. 16d, the polymer structure 140 is removed (step 166) using an etchant 152. Alternatively, the polymer structure 140 is not removed, resulting in different characteristics of the resulting structure, which is a composite structure having a metallic structure and insulator (i.e., the polymer structure). In one embodiment, the etchant is a 40 wt % potassium hydroxide aqueous solution. The resulting metallic structure 148 is cleaned by rinsing it with distilled water and immersing it in an isopropanol solution 154 (step 168) as illustrated in FIG. 16e and is then dried (step 170) to create a full metallic PhC 148. FIGS. 18a and 18c are SEM micrographs of a fabricated full metallic structure prior to etching the polymer structure away. FIGS. 18b and 18d are SEM micrographs of the fabricated full metallic structure after the polymer structure has been removed via the etchant 152.

Figure 19A:
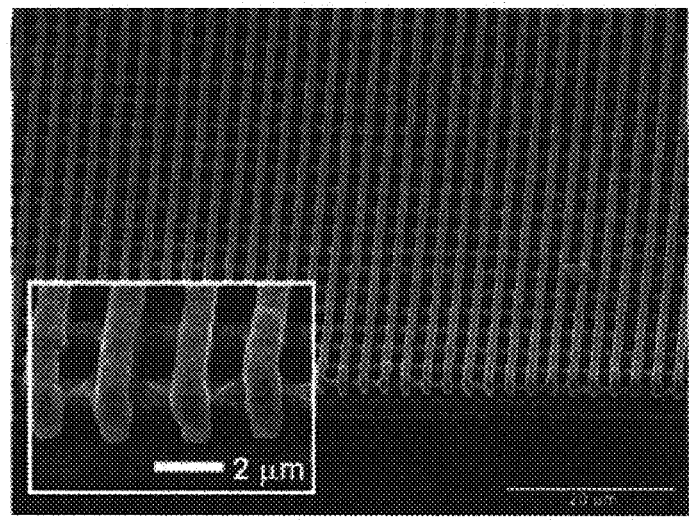
FIG. 19*a* is a photograph of a metallic PhC manufactured in accordance with the steps illustrated in FIG. 17.
Figure 19B:
FIGS. 19*b* and 19*c* are photographs of the metallic PhC of FIG. 19*a* glowing as a result of Joule heating.
Figure 19C:
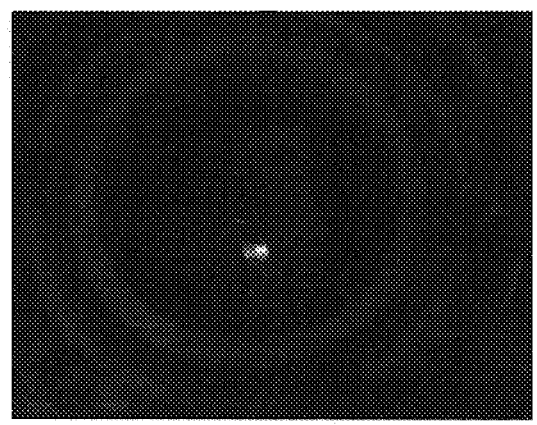

Turning now to FIGS. 19a-19c, the full-metallic structure 148 (e.g., the full-metallic structure of FIG. 19a) can be heated by passing an electrical current directly through the structure. In FIGS. 19b and 19c, the bright region is the PhC patterned region created in accordance with the above teachings. The emission of visible light is stronger than an unpatterned copper film with the same thickness, which is shown next to the patterned region. As a result, the full metallic PhCs can be used as light emitting devices. Ordinary incandescent lamps waste most of the supplied electric power emitting invisible light such as infrared. The full metallic layer-by-layer PhCs can be used as high-efficiency light emitting devices by reducing the radiation of undesired wavelengths. Fabrication of three dimensional full metallic photonic crystals using the techniques described above do not require costly equipment and processes (such as the equipment and processes used in conventional semiconductor processing), which would be a barrier to the commercialization of PhC light sources.

When an electrical current is passed through the metallic photonic crystals, enhanced thermal emission at certain wavelengths are observed. The observed emission spectra are similar to those of tungsten photonic crystals created by advanced semiconductor processing, which requires costly equipment and processes. Because the selective enhancement of thermal radiation can be altered by both fabricated structures and materials, the thermal emission characteristics of metallic photonic crystals can be tuned by changing the dimensions of photonic crystal structure and electroplating materials. Composite photonic crystals structure consisting of two or more materials including metals and insulators can be created to achieve wider tenability of thermal radiation.

Figure 20:
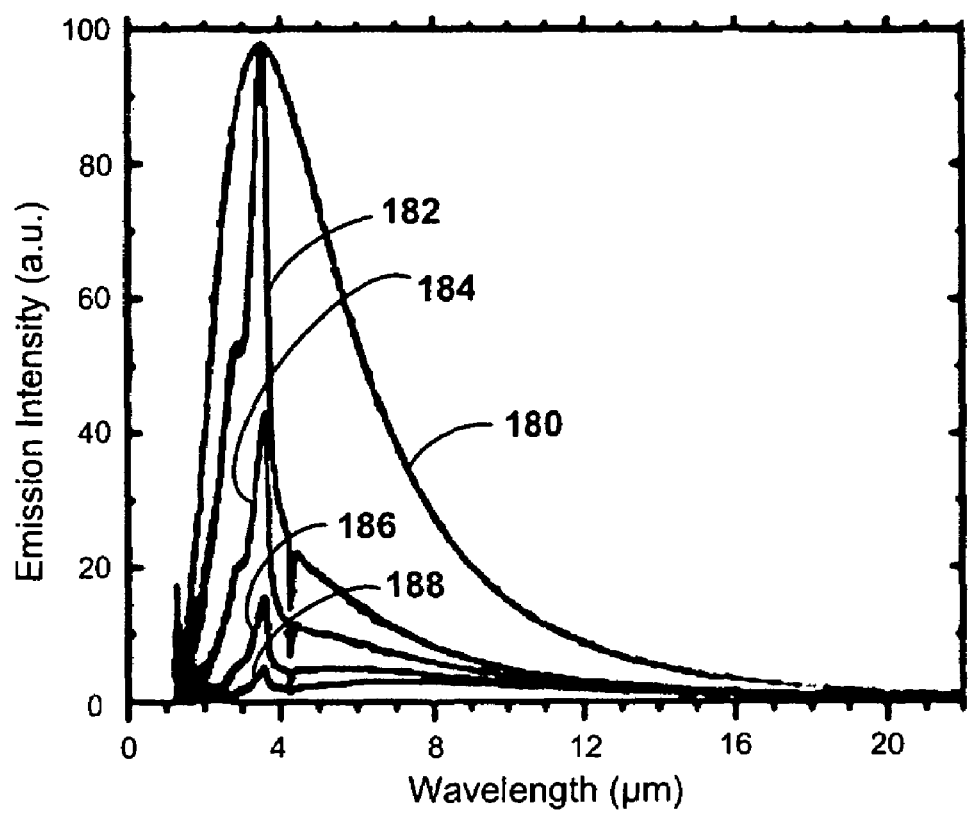
FIG. 20 is a graph illustrating emission spectra from a four-layer copper PhC manufactured in accordance with the methodology of FIG. 16.
Figure 21:
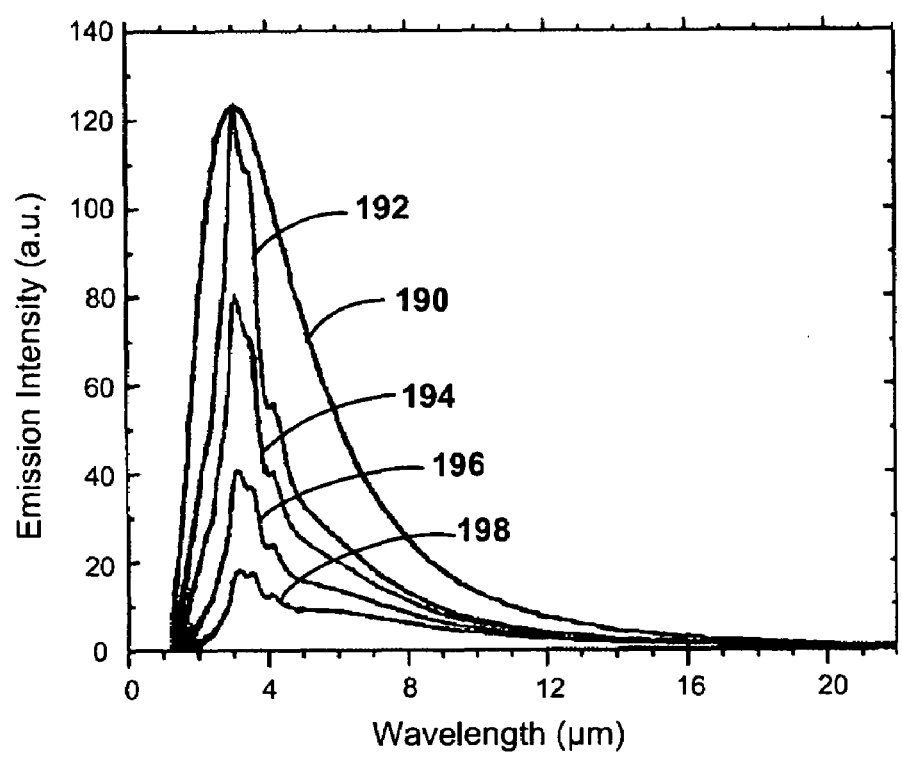
FIG. 21 is a graph illustrating emission spectra from a two-layer nickel PhC manufactured in accordance with the methodology of FIG. 16.
Figure 22:
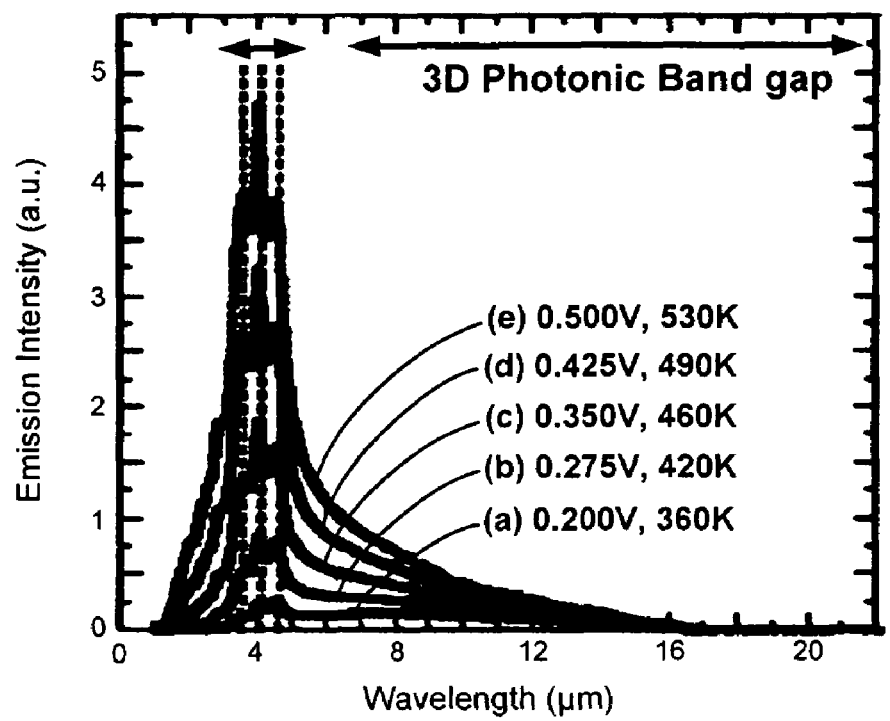
FIG. 22 is a graph illustrating emission spectra of a prior art five layer tungsten photonic crystal.

The thermal emission of four-layer full metallic PhCs was measured. Copper based metallic photonic crystals show enhanced thermal emission around 3.5 μm and suppressed thermal emission for longer wavelengths as seen in FIG. 20. Line 180 is the graybody emission at 838K representing a conventional light source. Line 182 is the emission of the four-layer copper photonic crystal with a current of 6.1 amperes. Line 184 is the emission of the four-layer copper photonic crystal with a current of 5.5 amperes. Line 186 is the emission of the four-layer copper photonic crystal with a current of 5.0 amperes. Line 188 is the emission of the four-layer copper photonic crystal with a current of 4.3 amperes. The enhanced emission peak is sharper and simpler than that of a tungsten photonic crystal by Sandia group (see FIG. 22) because of low intrinsic absorption of copper in infrared region. Nickel based photonic crystals show einanced thermal emission peaks around 3.5 μm and suppressed thermal emission for longer wavelengths as seen in FIG. 21. Line 190 is the graybody emission at 950K representing a conventional light source. Line 192 is the emission of the four-layer copper photonic crystal with a current of 8.3 amperes. Line 194 is the emission of the four-layer copper photonic crystal with a current of 7.9 amperes. Line 196 is the emission of the four-layer copper photonic crystal with a current of 7.4 amperes. Line 198 is the emission of the four-layer copper photonic crystal with a current of 7.0 amperes. The enhanced region is broader than that of a copper photonic crystal in FIG. 20 because of the relatively large intrinsic absorption of nickel in the infrared region. The emission spectra of the nickel photonic crystal are similar to those of the tungsten photonic crystal.

Figure 23:
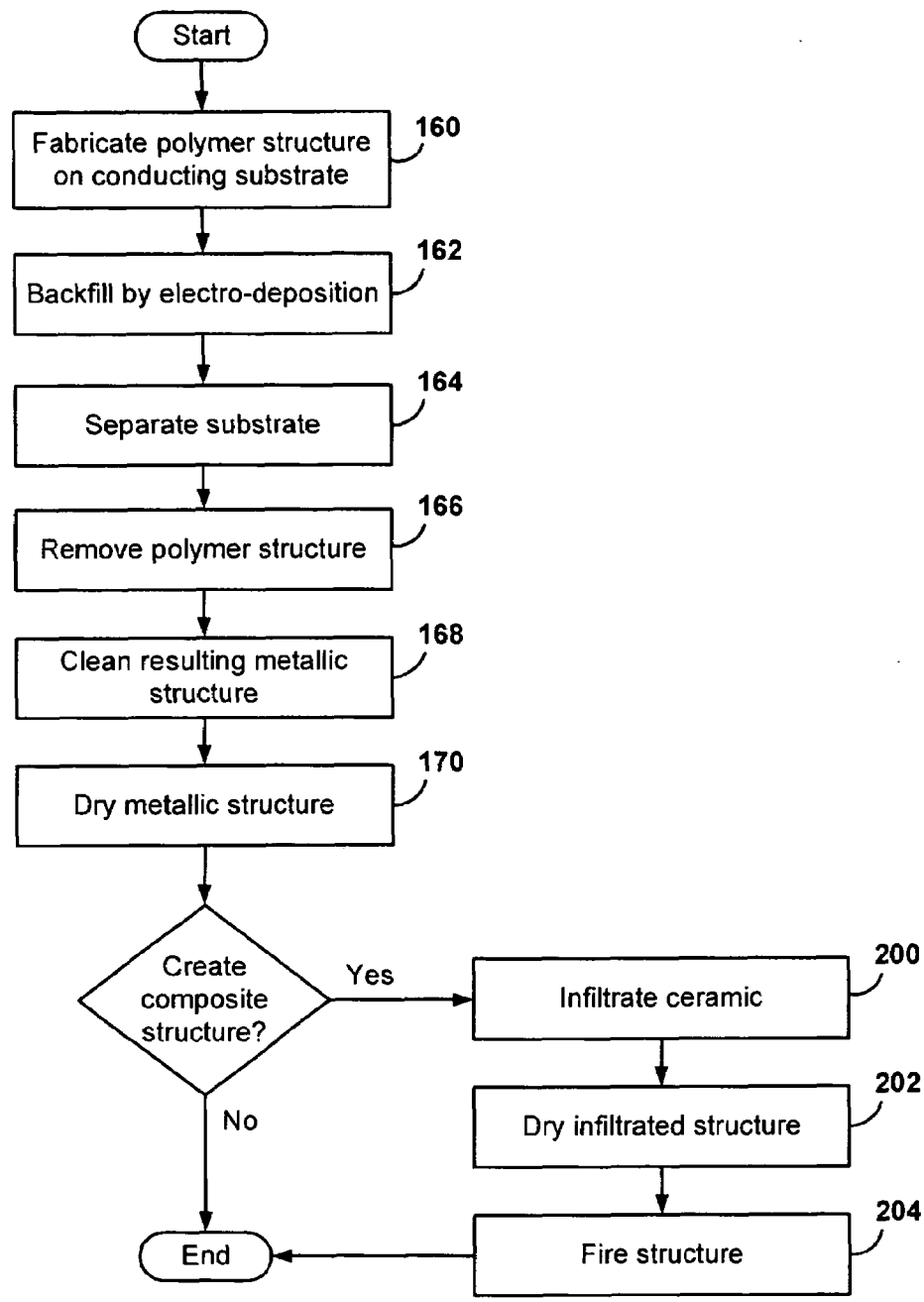
FIG. 23 is a flowchart illustrating the steps to create a composite PhC in accordance with the methodology.

Composite photonic crystals structure consisting of two or more materials including metals and insulators, such as, for example, the metallic structure with the polymer structure not removed, can be created to achieve wider tenability of thermal radiation. Turning now to FIG. 23, a full metallic structure with ceramic insulator can be created. Once the polymer structure is removed and the metallic structure cleaned and dried, a ceramic in the form of titania slurry or the like is infiltrated into the full metallic structure (step 200). The resulting structure is dried (step 202) and then fired (step 204) to create a composite photonic crystal. Note that in this technique, the metal is refractory enough to survive firing.

Figure 24:
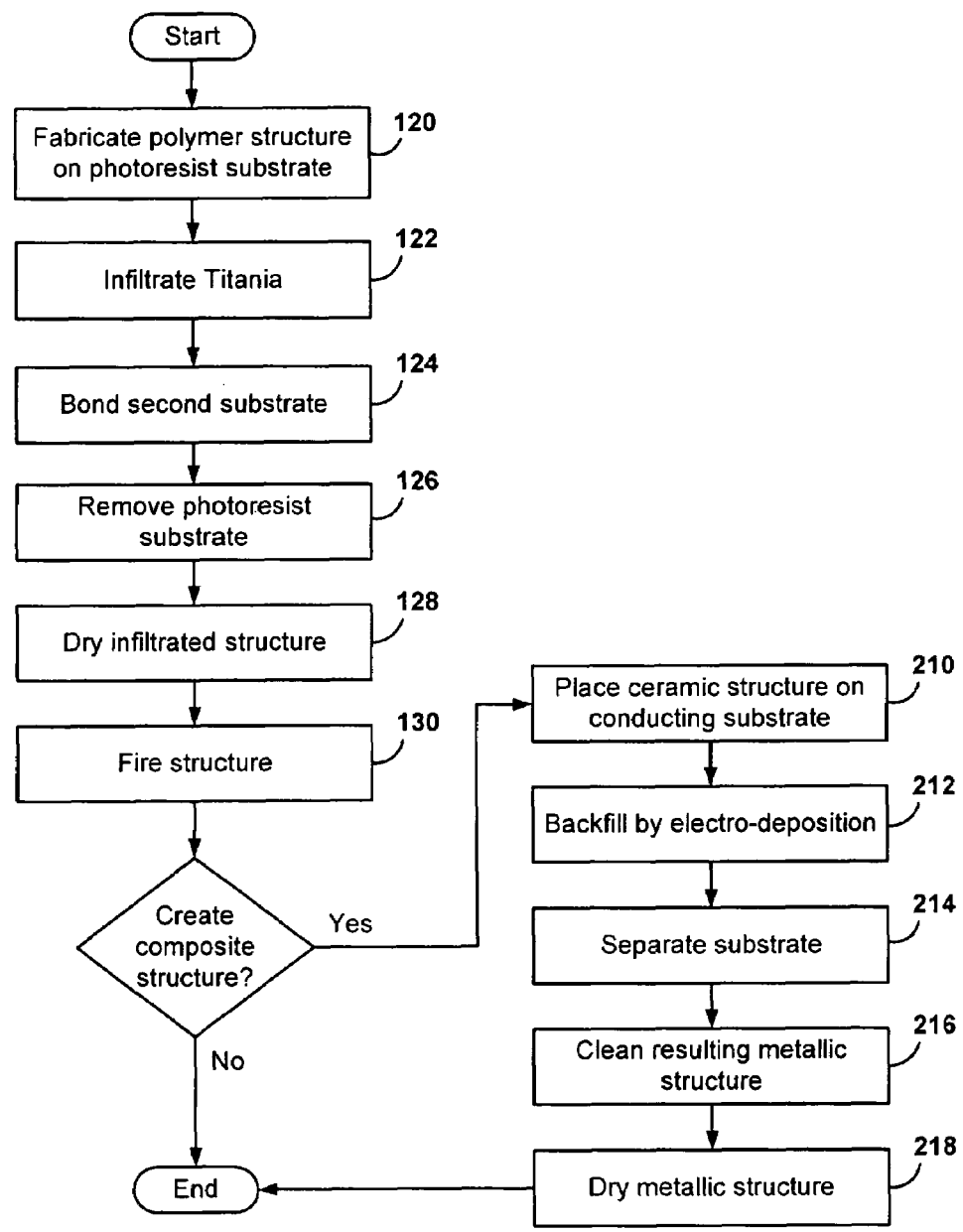
FIG. 24 is a flowchart illustrating alternate steps to create a composite PhC.

Alternatively, a ceramic structure can be infiltrated with metal. Turning now to FIG. 24, the ceramic structure is mounted to a conducting substrate (step 210). The ceramic structure and conducting substrate are placed in an electrolyte and a voltage is applied to the conducting substrate and a conductive element placed above the ceramic structure. The conductive element may be a copper plate or nickel plate, depending on whether the metal to be electro-deposited is copper or nickel. The structure is backfilled (step 212), resulting in a metallic structure between the ceramic rods of the structure. The backfilled structure is separated from the conducting substrate (step 214). The resulting composite structure is cleaned by rinsing it with distilled water and immersing it in an isopropanol solution (step 218) and is then dried (step 218) to create a composite photonic crystal.

Figure 25:
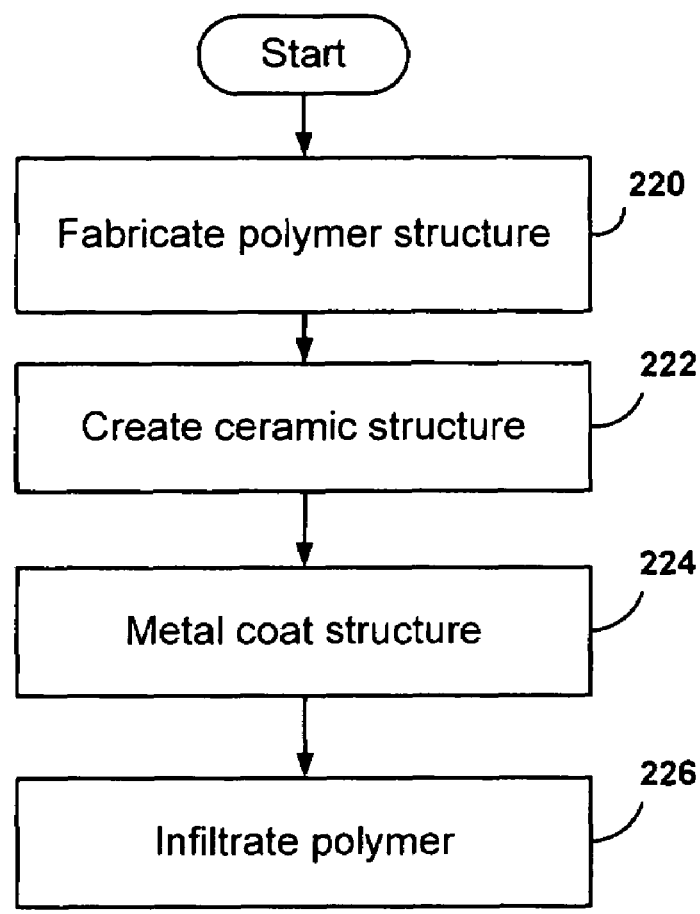
FIG. 25 is a flowchart illustrating steps to create a three component PhC.

Additionally, a three component composite could be manufactured. Turning now to FIG. 25, the most feasible technique to achieve this is to create a multi-layer polymer structure using the techniques described above (step 220). A ceramic structure is created (step 222) by infiltrating the multi-layer polymer structure with ceramic and burning off the polymer structure via firing as described above. The ceramic structure is coated with metal (e.g., gold coat sputtering) (step 224) as described above. The metal coated structure is then infiltrated with a polymer (step 226).

From the foregoing, it can be seen that a fabrication method using a two polymer microtransfer molding technique has been described. The fabrication methods are based on soft lithographic techniques that include layer-by-layer template fabrication, structure alignment and metallic backfilling, coating, or ceramic infiltration. These methods can be easily extendable for introduction of defects in 3D photonic crystals. With these techniques, freestanding metal coated crystals, full metallic crystals and ceramic crystals on a silicon substrate have been fabricated.

The foregoing description of various embodiments of the invention has been presented for purposes of illustration and description. It is not intended to be exhaustive or to limit the invention to the precise embodiments disclosed. Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

We claim:

1. A method to manufacture a photonic crystal having a multi-layer structure, the multi-layer structure having a number of dielectric rods to form a plurality of planar layers, the plurality of planar layers one on the other to form a multi-dimensional structure, each planar layer having a plurality of dielectric rods arranged with parallel axes at a given spacing, each planar layer having its axes oriented at an approximately ninety degree angle with respect to adjacent planar layers, the method comprising:
   a) filling a plurality of grooves of an elastomeric mold with a first polymer that can be UV cured, each groove in the plurality of grooves in parallel with each other, so as to partially form the dielectric rods of one of the plurality of planar layers;
   b) partially curing the first polymer;
   c) coating a second polymer on the first polymer, resulting in a filled elastomeric mold to thereby complete formation of the dielectric rods of one of the plurality of planar layers;
   d) placing one of a substrate or a multi-layer polymer structure on the filled elastomeric mold;
   e) exposing the one of the substrate or the multi-layer polymer structure and the filled elastomeric mold to UV light;
   f) peeling the filled elastomeric mold away from the first polymer and the second polymer such that the first polymer and second polymer form a polymer layer of polymer rods on the one of the substrate and the multi-layer polymer structure; and
   g) forming the multi-layer polymer structure by repeating steps a to f until a desired number of polymer layers have been formed.

2. The method of claim 1 wherein the step of filling the plurality of grooves of the elastomeric mold with the first polymer comprises the steps of placing a drop of the first polymer outside of the plurality of grooves and dragging the drop of the first polymer across the elastomeric mold with a blade.

3. The method of claim 2 wherein the step of a second polymer on the first polymer comprises the step of dragging a drop of the second polymer across the elastomeric mold with a blade.

4. The method of claim 3 wherein the step of dragging a drop of the second polymer comprises the steps of moving the blade in a forward movement at a speed of approximately 0.5 mm/sec and moving the blade in a backward movement at a speed of approximately 100 µm/sec.

5. The method of claim 3 wherein the step of dragging a drop of the second polymer across the elastomeric mold with a blade comprises the step of dragging a drop of the second polymer across the elastomeric mold with a blade with a contact angle of the second polymer with respect to the first polymer of approximately eight degrees and another contact angle of the second polymer with the PDMS mold of approximately 54 degrees.

6. The method of claim 2 wherein the step of coating the drop of the first polymer across the elastomeric mold with a blade comprises the steps of moving the blade in a forward movement at a speed of approximately 0.5 mm/sec and moving the blade in a backward movement at a speed of approximately 30 µm/sec.

7. The method of claim 1 wherein the step of partially curing the first polymer comprises the step of partially curing the first polymer such that the first polymer solidifies.

8. The method of claim 1 wherein the polymer rods in a polymer layer are in parallel with each other and wherein the step of forming the multi-layer polymer structure includes the steps of
UV curing an initial polymer layer on the substrate;
UV curing a plurality of polymer layers on the initial polymer layer until a predetermined number of polymer layers are stacked on the initial polymer layer; each layer of the plurality of polymer layers placed at a location such that the polymer rods of each layer are at an approximately ninety degree angle to the polymer rods of an adjacent layer of the plurality of polymer layers and such that polymer rods of alternate layers are substantially in parallel and offset to each other.

9. The method of claim 8 wherein the polymer rods in a polymer layer are spaced apart by a predetermined distance and the offset is approximately one half of the predetermined distance.

10. The method of claim 1 further comprising the step of aligning the polymer layers of the multi-layer polymer structure.

11. The method of claim 10 wherein the step of aligning the polymer layers of the multi-layer polymer structure comprises the steps of:
pointing a light source at an initial layer and a second layer stacked on the initial layer at an approximately ninety degree angle to initial layer;
determining if a resulting first order diffracted moiré fringe (first-DMF) pattern matches a pattern of an aligned structure; and
if the resulting first-DMF pattern is not the pattern of an aligned structure, moving the second layer until the resulting first-DMF pattern matches the pattern of an aligned structure.

12. The method of claim 11 further comprising the steps of:
for subsequent layers of the multi-layer polymer structure:
shining a light source through the multi-layer polymer structure; and
moving the subsequent layers of the multi-layer polymer structure until a first-DMF pattern matches the pattern of an aligned structure for the same number of layers.

13. The method of claim 1 wherein the multi-layer polymer structure has channels, the method further comprising the steps of:
introducing a ceramic bearing material into the channels to form a ceramic and polymer structure; and
heating the ceramic and polymer structure to decompose the polymer structure to create a ceramic multi-layer structure.

14. The method of claim 13 wherein the ceramic multi-layer structure has channels, the method further comprising the steps of:
placing the ceramic multi-layer structure on a conducting substrate;
placing the ceramic multi-layer structure and the conducting substrate in an electrolyte solution;
applying a voltage to the conducting substrate and a conductive element placed above the multi-layer polymer structure such that the channels are filled with a metallic structure, resulting in a composite photonic crystal; and
separating the composite photonic crystal from the conducting substrate.

15. The method of claim 13 further comprising the steps of:
sputter coating the ceramic multi-layer structure with a metal to form a metal coated ceramic multi-layer structure; and
infiltrating channels in the metal coated ceramic multi-layer structure with a polymer.

16. The method of claim 1 wherein the multi-layer polymer structure has channels and the substrate is a conducting substrate, the method further comprising the steps of:
placing the multi-layer polymer structure in an electrolyte solution;
applying a voltage to the conducting substrate and a conductive element placed above the multi-layer polymer structure such that the channels are filled with a metallic structure;
separating the metallic structure and multi-layer polymer structure from the conducting substrate; and
separating the metallic structure from the multi-layer polymer structure.

17. The method of claim 16 further comprising the step of cleaning the metallic structure.

18. The method of claim 16 wherein the conductive plate is one of copper and nickel.

19. The method of claim 18 wherein the conducting substrate comprises an indium-tin-oxide (ITO) coated glass and the step of separating the metallic structure and multi-layer polymer structure from the conducting substrate comprises the step of peeling the ITO coated glass away from the metallic structure and multi-layer polymer structure.

20. The method of claim 16 wherein the metallic structure has channels, the method further comprising the steps of:
introducing a ceramic bearing material into the channels to form a ceramic and metallic structure; and
heating the ceramic and metallic structure to create a composite photonic crystal.

21. The method of claim 1 further comprising the steps of:
attaching a metal frame to the multi-layer polymer structure;
separating the substrate from the multi-layer polymer structure; and
metal coating the multi-layer polymer structure.

* * * * *

UNITED STATES PATENT AND TRADEMARK OFFICE
CERTIFICATE OF CORRECTION

PATENT NO. : 7,625,515 B2 Page 1 of 1
APPLICATION NO. : 11/455486
DATED : December 1, 2009
INVENTOR(S) : Lee et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 652 days.

Signed and Sealed this

Second Day of November, 2010

David J. Kappos
*Director of the United States Patent and Trademark Office*